United States Patent [19]

Igarashi

[11] 4,361,200
[45] Nov. 30, 1982

[54] ENGINE CONTROL SYSTEM FOR A COMBINATION CAR SYSTEM

[75] Inventor: Isao Igarashi, Okazaki, Japan

[73] Assignee: Toyota Jidosha Kogyo Kabushiki Kaisha, Toyota, Japan

[21] Appl. No.: 207,436

[22] Filed: Nov. 17, 1980

[30] Foreign Application Priority Data

Nov. 16, 1979 [JP] Japan .................. 54-158751[U]

[51] Int. Cl.³ ............... B60D 7/00; B60K 26/00; B62D 63/00
[52] U.S. Cl. .................. 180/14 R; 180/11; 180/12; 180/54 C; 180/209; 180/321; 180/335; 296/196
[58] Field of Search .......... 180/11, 12, 14 R, 14 A, 180/209, 54 C; 296/164, 165, 196; 280/402, 335, 321, 315; 105/215 R, 215 C

[56] References Cited

U.S. PATENT DOCUMENTS

| | | | |
|---|---|---|---|
| 1,804,257 | 5/1931 | Greenley | 180/14 A |
| 3,027,962 | 4/1962 | Wolf | 180/14 A |
| 3,255,837 | 6/1966 | Wolf | 180/14 R |
| 3,719,244 | 3/1973 | Miller et al. | 180/14 R |
| 3,889,770 | 6/1975 | Herbert | 180/14 R |
| 4,150,841 | 4/1979 | Ayotte et al. | 180/14 A |

FOREIGN PATENT DOCUMENTS

| | | | |
|---|---|---|---|
| 2617277 | 11/1977 | Fed. Rep. of Germany | 296/165 |
| 2006130 | 5/1979 | United Kingdom | 280/402 |

Primary Examiner—Joseph F. Peters, Jr.
Assistant Examiner—Donn McGiehan
Attorney, Agent, or Firm—Kenyon & Kenyon

[57] ABSTRACT

A combination car system is made up from a first car and a second car, both of which are capable of running independently. The first car includes a pair of front wheels by which it is driven, a pair of rear wheels, and an engine the output of which is controlled by a first engine output control element. The second car includes a pair of front wheels, a pair of rear wheels by which it is driven, and an engine the output of which is controlled by a second engine output control element. When the cars are running independently, displacement of an accelerator pedal in the first car is transmitted by a first displacement transmission mechanism to the first engine output control element, and displacement of an accelerator pedal in the second car is transmitted by a second displacement transmission mechanism to the second engine output control element. The second displacement transmission mechanism includes: a connection unit; a first displacement transmission submechanism which is detachably coupled to, and which transmits displacement of the accelerator pedal of the second car to, this connection unit; and a second displacement transmission submechanism, which transmits displacement of this connection unit to the second engine output control element. The first car and the second car are couplable together into a combination car which runs on the front wheels of the first car and on the rear wheels of the second car, the rear wheels of the first car and the front wheels of the second car being at this time removed from road contact. At this time, the coupling of the first displacement transmission submechanism is removed from the connection unit, and a third displacement transmission mechanism is fitted to extend between and to transmit displacement between a part of the first displacement transmission mechanism in the first car and the connection unit. Thereby both the engines of the combination car may be controlled by using the accelerator pedal of the first car, and the accelerator pedal of the second car is at this time disenabled.

7 Claims, 34 Drawing Figures

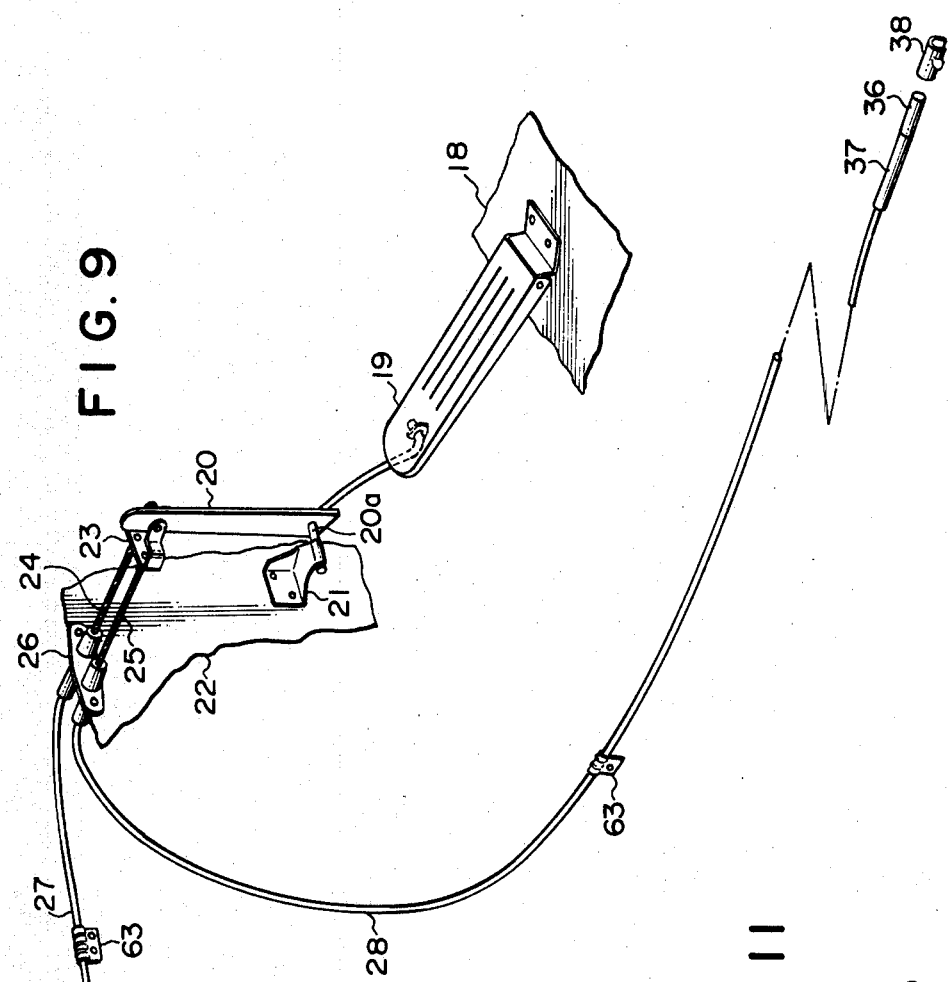
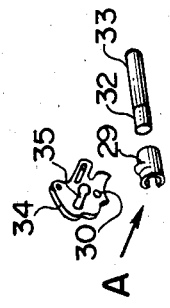
FIG. 9
FIG. 10
FIG. 11

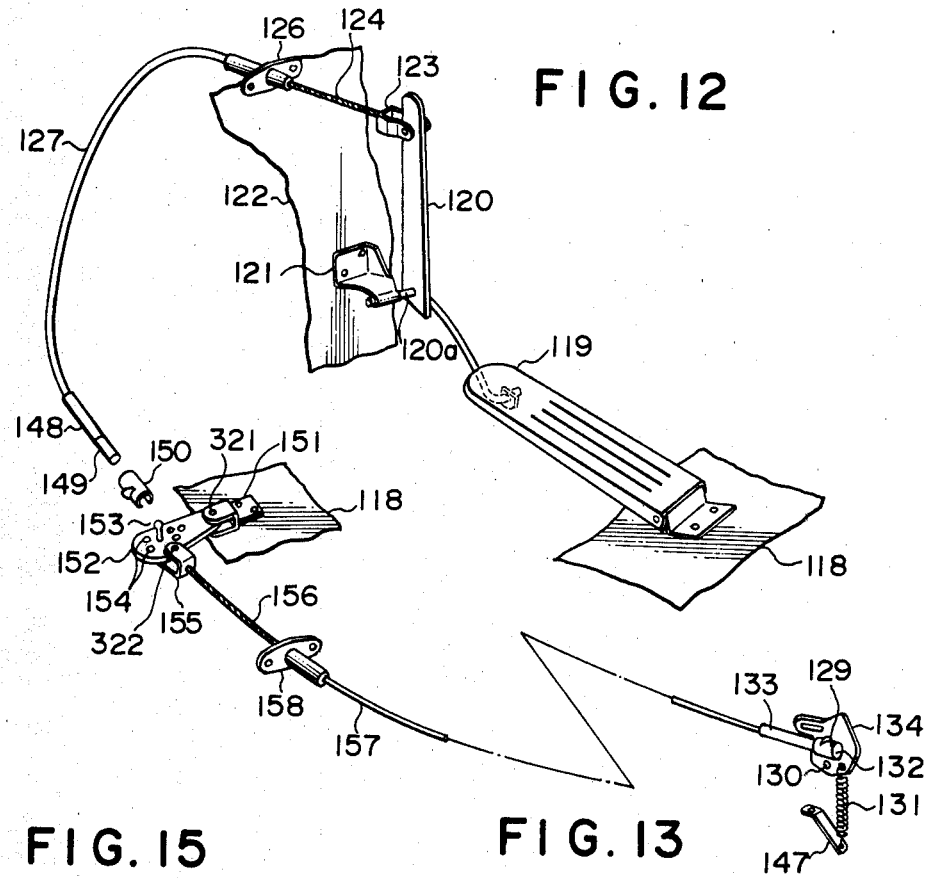
FIG. 12
FIG. 13
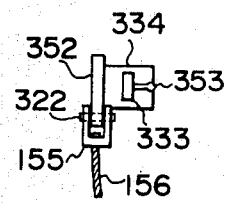
FIG. 15
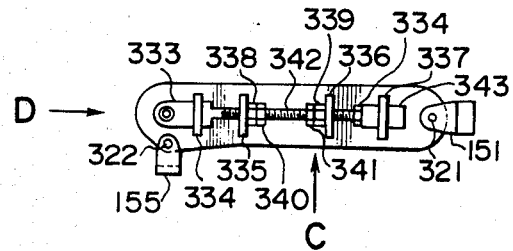
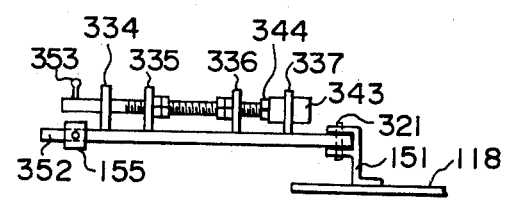
FIG. 14

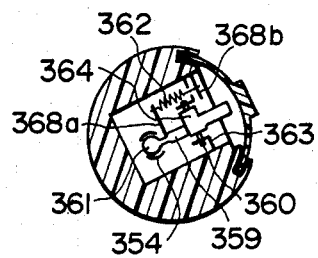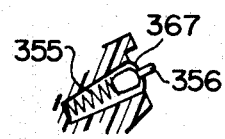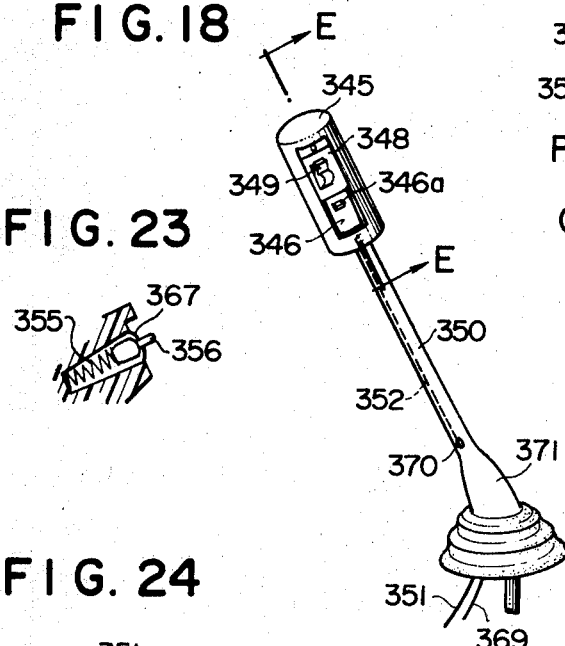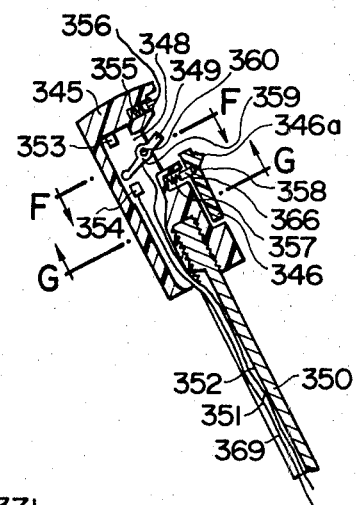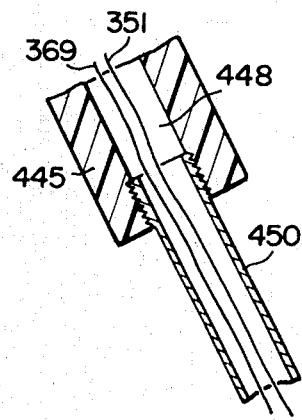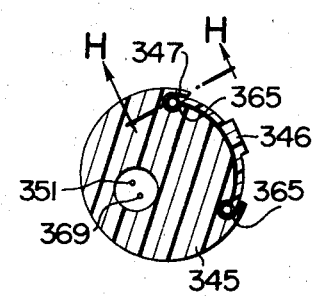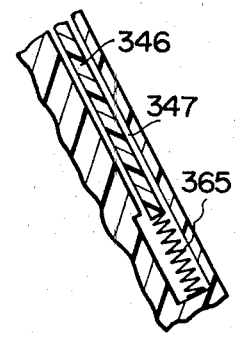

ENGINE CONTROL SYSTEM FOR A COMBINATION CAR SYSTEM

BACKGROUND OF THE INVENTION

The present invention relates to the field of motor vehicles, and more particularly relates to an engine control system in a combination motor vehicle system of a basically new configuration.

In the use of modern family cars, it is very usual for such a car to be operated with one or at the most two people riding therein, along with a small amount of luggage which is being carried. That is to say, although the normal passenger car of today is able comfortably to carry four or five people and quite a lot of luggage, in practice according to modern lifestyles such a four seater passenger car is not usually used to its full capacity. In particular, during the everyday life of the average nuclear family, the principal day to day uses of a passenger car are either for a wage earning member of the family to commute to and fro between home and office, or for a home making member of the family to undertake local errands such as shopping, taking children to and from school, and the like. In both of these operational modes, the full capacity of the average modern passenger car is not used.

However, of course, from the point of view of family togetherness and fun, the not so frequently used mode of operation of a modern family car, in which it is used to carry all the family members, such as the spouses and their children for a weekend outing or the like, is very important, although this operational mode in fact may not account for a high proportion of the actual distance and time the vehicle is used. It would be quite unacceptable for the modern family car not to possess such a high capacity potential, although this potential is not in fact used very often. Since a normal passenger vehicle such as a car which is capable of carrying four or five persons and a fair quantity of luggage, i.e. which is capable of comfortably transporting the average family, necessarily must be constructed with quite a large and heavy body, and accordingly requires an engine of a suitably high power output to move this body, the problem has arisen that, during the abovementioned habitual under capacity use of such a car, a considerable amount of fuel is wasted.

Further, such a full size passenger car is again, according to the abovementioned concept of potential to handle the maximum possible likely load, typically constructed in such a fashion that it is able to operate for extended periods at high road speeds, such as during expressway driving. However, again, in practical use, this expressway operating capacity is not very often required, especially during commuting or during short local shopping trips.

A further cause of waste and unnecessary expense in the present life style of many families is due to the fact that several road vehicles such as passenger cars are often provided for the different members of the family. For example, in the usual case when one member of the family commutes to and fro between home and work daily, while another member of the family remains in or in the general vicinity of the home in order to supervise the children or the like, the requirement has arisen for each of these family members to be in possession of his or her own car, and according to this two car ownership by the average family has become very common in the developed world. Especially nowadays, as urban sprawl progresses, many new suburban or so called satellite developments are being constructed in areas where public transport facilities are poor or nonexistent, and in such areas the provision of at least two cars for the average family has become almost a necessity. It is also the case that in many regions of the world public transport facilities are being contracted in their size and in the frequency of their operations, and accordingly, again, the tendency towards multi car ownership in the average family has been increasing. Further, the general rise in income levels of the population has also contributed to this tendency.

However, since it has heretofore been the case that each of the multiple vehicles owned by a multi car family is a full size car, the aforesaid energy wastage due to under capacity operation of these cars, and the amount of renewable and non renewable resources such as steel, glass, rubber, and the like, employed in the production and maintenance of these multiple full size cars, have a tendency to become very excessive. Also, even with the present high income levels in developed areas of the world, the cost of maintaining and operating two separate full sized cars is often quite a burden for the average middle class family. a combination car system, comprising: (a) a first car, capable of running independently, comprising a first pair of front wheels by which said first car is driven, a first pair of rear wheels, a first engine, a first braking system, and a first transmission; said first engine, said first braking system, and said first transmission, when said first car is running independently, being controlled from said first car; and (b) a second car, capable of running independently, comprising a second pair of front wheels, a second pair of rear wheels by which said second car is driven, a second engine, a second braking system, and a second transmission; said second engine, said second braking system, and said second transmission, when said second car is running independently, being controlled from said second car; (c) said first car and said second car being couplable together into a coupled car which runs on said first pair of front wheels of said first car and said second pair of rear wheels of said second car, with said first pair of rear wheels of said first car and said second pair of front wheels of said second car being removed from road contact; at that time: (c1) the operation of said first engine of said first car being coupled to the operation of said second engine of said second car, so that the combined operation of both said first engine and said second engine is controlled from said first car; (c2) the operation of said first braking system of said first car being coupled to the operation of said second braking system of said second car, so that the combined operation of said first braking system and said second braking system is controlled from said first car; (c3) and said second transmission of said second car being controlled from said first car; (d) whereby said combination car system as a whole may be operated by a person sitting in said first car; whereby a dual transport facility is available, either for a fairly large number of people and/or baggage to be transported in one fairly large sized vehicle, or for two independent vehicles to be available, each capable of carrying a fairly small number of persons and/or baggage to different destinations at the same time; whereby family life may be promoted.

According to such a construction, when the first car and the second car are running independently, one of them may be used by the wage earning member of the family to commute to and fro between home and office or workplace, while the other may be used by the home making member of the family to perform short local shopping trips or the like; and, during this operational mode, in which neither of the cars is required to carry more than two people and a modest amount of luggage, the small size of each of the first car and the second car, (which is a matter of course, due to their basic construction), ensures that their individual operation is not wasteful of fuel. On the other hand, when the entire family wishes to travel together in one car, which would be quite impractical in either the first or the second car running independently by itself, because of space limitations, then the first car and the second car may be coupled together so as to form the coupled or combination car, and in this operational mode an entire average family, along with a fair quantity of their baggage, may conveniently and comfortably travel for an extended period, such as on an expressway. Accordingly, in this operational mode, again, a car is provided which is of an appropriate size and capacity adapted to the work which it is required to perform.

It is preferable, for operational smoothness, according to a particular aspect of the above described construction, that the transmission of the second or rear car is an automatic transmission.

Further, according to various particular aspects of the above described construction, the front wheels of the first car and the rear wheels of the second car may be larger in diameter, respectively, than the rear wheels of the first car and the front wheels of the second car. This is in order to ensure convenience in storage or disposal of the rear wheels of the first car, and the front wheels of the second car, when the first and the second car are coupled together to form the combination car.

It may be considered that this difference in size between the wheels on the front and rear axles of the first and second cars would deteriorate the riding characteristics of the first car and of the second car, when these cars are used on their own. However, because these cars are not operated separately, typically, at very high speeds or for very great distances, this will not in practice cause any severe problem, although of course the comfortableness of the separately operated first and second cars will be somewhat inferior to those of a normal full sized automobile. On the other hand, these cars provide great convenience in parking, requiring less space for occupation, and being much easier to put into and to take out of such a space.

Further, according to another particular aspect of the above described construction, it is possible for these superfluous rear wheels of the first car and these superfluous front wheels of the second car, when the first and the second car are coupled together into the combination car, to be stored below, respectively, the second car and the first car. Alternatively, according to another particular aspect of the above described construction, it is possible for the superfluous rear wheels of the first car to be stored above the first car, and for the superfluous front wheels of the second car to be stored above the second car, during operation of the combined car. These various suggestions provide good stowability for these unwanted wheels, during coupled operation of the combination car.

When the first car and the second car are operated in the coupled form as the combination car, the fact that all four wheels of this combination car are driven—the front wheels by the engine of the first car, and the rear wheels by the engine of the second car—ensures that the operational characteristics of this combination car are excellent. Since in the operation of the combination car it is to be expected that long distance high speed journeys such as expressway journeys will figure largely if not predominate, this is very important from the point of view of safety. At this time, further, because both the first engine of the first car, and the second engine of the second car, are being used for driving the combination car, thus the power available is high, and is suitable for high speed operation of quite a heavy motor vehicle.

It is of course inevitable that the first car and the second car, when operated independently, will have structures of unconventional appearance, since they essentially incorporate only the front or the back half, respectively, of a normal motor vehicle. Accordingly, there is a risk that these relatively light capacity vehicles by themselves when being operated in the separated mode will excite amusement and derision in the public. However, when these two rather unconventional vehicles are coupled together to form the combination car, then this vehicle, which will be of a large and impressive form, will strike admiration into the eyes and hearts of the beholders, and by its impressive majesty will quite rebut any criticism that may have been made of the lowly appearance of the separated cars. Accordingly, the owner or owners of the combination car system will be filled with self confidence and inspiration, and will certainly not be ashamed of the modest look of either the first car or the second car on its own, in view of the splendor of the combination car.

Further, as the production of the combination car system according to the above described construction becomes more and more widespread, and the concept thereof becomes well understood by the public, this will cause the beneficial social effect of discouraging the present, alas too widespread, social habit of regarding the size of a motor vehicle as indicative of the social status of its owner, although each of the first car and the second car is small and insignificant on its own, the combination car will certainly not be of an inferior appearance, or of a size appropriate to a lower class driver.

However, in such a combination car system of a construction as described above, a requirement arises for an engine control system. In more detail, as specified above, when the first car and the second car are coupled together to form the combination car, then the operation of the first engine of the first car should be coupled to the operation of the second engine of the second car, so that the combined operation of both the first engine and the second engine may be controlled from the first car, i.e. from the front part of the combination car. On the other hand, of course, when the first car and the second car are operating independently, the first engine of the first car should be controllable from the first car, and the second engine of the second car should be controllable from the second car. Accordingly, a requirement has arisen for an engine control system that can provide these two different operational modes.

SUMMARY OF THE INVENTION

Therefore, it is an object of the present invention to provide an engine control system for such a combination car system, which can provide independent control of the first engine from the first car, and of the second engine from the second car, when the first car and the second car are running independently; and which, on the other hand, can provide coupled operation, of both the first engine of the first car and the second engine of the second car, from the first car, when the first car and the second car are being operated together as coupled together into the combination car.

It is a further object of the present invention to provide an engine control system, for such a combination car system in which the first car includes a first accelerator pedal and the second car includes a second accelerator pedal, which, when the first car and the second car are operating independently, can provide control of the frist engine of the first car from the first accelerator pedal, and can provide control of the operation of the second engine of the second car from the second accelerator pedal; and which, on the other hand, when the first car and the second car are being operated together as coupled together into the combination car, can provide coupled operation of both the first engine of the first car and the second engine of the second car from the first accelerator pedal of the first car, the controlling operation of the second accelerator pedal of the second car at this time being disenabled.

It is a further object of the present invention to provide such an engine control system as detailed above, in which the coupling together of the operation of the first engine of the first car and of the second engine of the second car, when the first car and the second car are being operated together as coupled together into the combination car, is provided via a displacement transmission mechanism for coupled use, which extends from a part of the accelerator pedal linkage of the first car to a part of the accelerator pedal linkage of the second car, so as to transmit controlling displacement of the first accelerator pedal to the accelerator pedal linkage of the second car so as to control said second engine of said second car.

It is a further object of the present invention to provide an engine control system as detailed above, in which good adjustability is provided, both of the two independent accelerator pedal linkages used for independent operation of the first car and of the second car, and also of the combined accelerator pedal linkage used for operation of the combination car made up of the first and the second car as coupled together, which as specified above provides combined control, of both the first engine of the first car and also the second engine of the second car, from the accelerator pedal of the first car.

It is a further object of the present invention to provide such an engine control system as detailed above, in which the accelerator pedal linkage of the second car is constructed out of a first displacement transmission submechanism, a connection unit, and a second displacement transmission submechanism, so that, when the second car is being operated independently, the first displacement transmission submechanism transmits displacement of the second accelerator pedal of the second car to the connection unit, while the second displacement transmission submechanism transmits displacement of the connection unit to an engine output control element of the second engine of the second car; while, on the other hand, when the first car and the second car are being operated as coupled together into the combination car, the first displacement transmission submechanism is disconnected from the connection unit, and the aforesaid displacement transmission mechanism for coupled use is connected from the accelerator pedal linkage of the first car to the connection unit instead of said first displacement transmission submechanism, thus transmitting displacement of the first accelerator pedal of the first car to the engine output control element of the second engine of the second car.

It is a further object of the present invention to provide such an engine control system as detailed above, in which said connection unit is so constructed that the ratio of its output displacement amount to its input displacement amount, with reference to its transmission of displacement from either said first displacement transmission submechanism or from said displacement transmission mechanism for coupled use, via said second displacement transmission submechanism, to said second engine output control element, may be varied.

It is a yet further object of the present invention to provide such an engine control system, in which said variation of the ratio of the output displacement amount to the input displacement amount of the connection unit may be performed continuously.

According to the present invention, these and other objects are accomplished by, in a combination car system, comprising: (a) a first car, capable of running independently, comprising a first pair of front wheels by which said first car is driven, a first pair of rear wheels, a first engine, and a first engine output control element, displacement of which controls the engine output of said first engine; and (b) a second car, capable of running independently, comprising a second pair of front wheels, a second pair of rear wheels by which said second car is driven, a second engine, and a second engine output control element, displacement of which controls the engine output of said second engine; (c) said first car and said second car being couplable together into a coupled car which runs on said first pair of front wheels of said first car and said second pair of rear wheels of said second car, with said first pair of rear wheels of said first car and said second pair of front wheels of said second car being removed from road contact: an engine control system, comprising: (d) a first accelerator pedal attached to said first car; (e) a first displacement transmission mechanism, which transmits displacement of said first accelerator pedal to said first engine output control element; (f) a second accelerator pedal attached to said second car; (g) a second displacement transmission mechanism, which, when said second car is running independently, transmits displacement of said second accelerator pedal to said second engine output control element, comprising: (g1) a connection unit; (g2) a first displacement transmission submechanism, which is, when said second car is running independently, removably drivingly coupled to said connection unit, and which at this time transmits displacement of said second accelerator pedal to said connection unit; and (g3) a second displacement transmission submechanism, which transmits displacement of said connection unit to said second engine output control element; (h) and a third displacement transmission mechanism which, when said first car and said second car are coupled together into said coupled car, extends from a part of said first displacement transmission mechanism to be removably drivingly coupled to said connection unit, said first displacement transmission submechanism being at this time uncoupled from said connection unit; (i) whereby, when said first car and said second car are coupled together into said coupled car, the operation of said first engine of said first car and the operation of said second engine of said second car are coupled together and are controlled from said first car by displacement of said first accelerator pedal, the controlling operation of said second accelerator pedal being at this time disenabled.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 9 is a perspective view of an accelerator pedal linkage system in such an FF car which is to be incorporated in a combination car according to the above described construction, said accelerator pedal linkage system being adapted to be linked to an accelerator pedal linkage system in a corresponding RR car, when the FF car and the RR car are coupled together to form the combination car, when these systems together form a first preferred embodiment of the engine control system according to the present invention;

FIG. 10 is an exploded perspective view of a part of the mechanism of the accelerator pedal linkage system shown in FIG. 9;

FIG. 11 is a view of a clip which is incorporated in the accelerator pedal linkage system shown in FIGS. 9 and 10, as seen in the direction indicated by the arrow A in FIG. 10;

FIG. 12 is a perspective view, similar to FIG. 9, showing an accelerator pedal linkage system in such an RR car which is to be incorporated in a combination car according to the above described construction, said accelerator pedal linkage system being adapted to be linked to an accelerator pedal linkage system, in a corresponding FF car, constructed like the accelerator pedal linkage system shown in FIGS. 9-11, when the FF car and the RR car are coupled together to form the combination car, said systems then together forming said first preferred embodiment of the engine control system according to the present invention;

FIG. 13 is a plan view, showing part of a possible alternative construction for the accelerator pedal linkage system in the RR car, which thus forms part of a second preferred embodiment of the engine control system according to the present invention;

FIG. 14 is a side view of the part of the accelerator pedal linkage system for the RR car shown in FIG. 13;

FIG. 15 is an end view of the part of the accelerator pedal linkage system for the RR car shown in FIGS. 13 and 14, as seen from the direction of the arrow D in FIG. 13;

FIG. 18 is a perspective view of a possible construction for a gear shift lever which may be incorporated in an FF car which is to be incorporated in a combination car according to the above described construction, showing an alternative possible construction for part of the device generally shown in FIG. 17, this part particularly relating to the engagement of "L" range on said automatic gearbox;

FIG. 19 is a cross sectional view through the knob of the gear shift lever shown in FIG. 18, taken in a plane perpendicular to the lines E—E, for showing the internal construction of an electric switch incorporated in said gear shift lever;

FIG. 20 is an enlarged cross sectional view through said knob of said gear shift lever shown in FIGS. 18 and 19, taken in a plane perpendicular to the lines F—F in FIG. 19;

FIG. 21 is an enlarged cross sectional view through said knob of said gear lever shown in FIGS. 18, 19, and 20, taken in a plane perpendicular to the lines G—G in FIG. 19;

FIG. 22 is an enlarged partial cross sectional view through part of a guide channel for a sliding switch cover fitted to said knob of said gear shift lever shown in FIGS. 18-21, taken in a plane perpendicular to the lines H—H in FIG. 21;

FIG. 23 is an enlarged axial cross sectional view of a catch for the aforesaid sliding switch cover for the switch in said knob of said gear shift lever shown in FIGS. 18–22;

FIG. 24 is a partial axial cross sectional view, showing an alternative possible construction for the stem of said gear shift lever, and for the base portion of said knob thereof;

DESCRIPTION OF THE PREFERRED EMBODIMENTS

Several preferred embodiments of the present invention will now be described, with reference to the appended drawings.

In the following, different aspect of the construction of various embodiments of the present invention will be described under appropriate section headings, for ease of organization and reference.

CONSTRUCTION OF THE FIRST EXAMPLE

Figure 1:
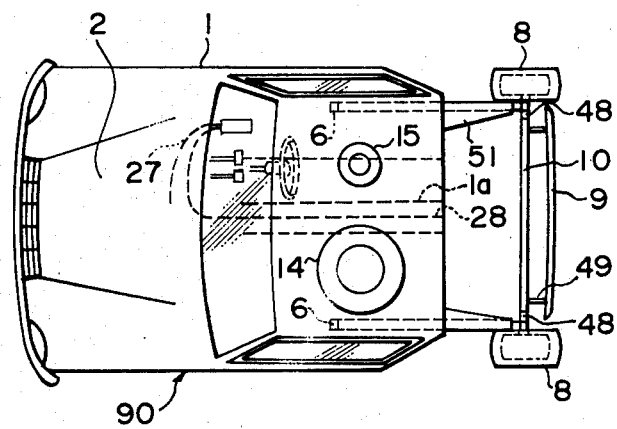
FIG. 1 is a plan view, in partly diagrammatical form, showing an FF car which is to be incorporated in a first exemplary constructional example of the combination car according to the above described construction.
Figure 2:
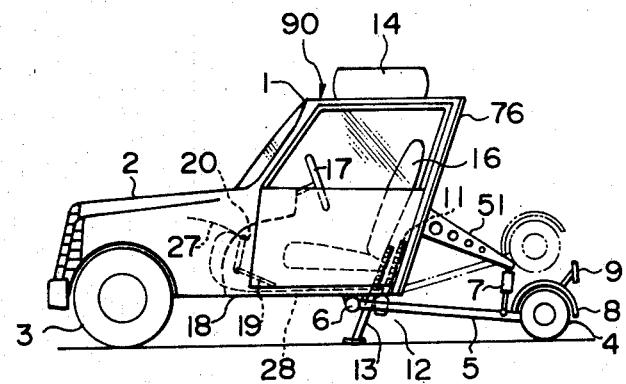
FIG. 2 is a side view, in partly diagrammatical form, of the FF car which is to be incorporated in the first exemplary constructional example of the combination car according to the above described construction, shown in FIG. 1.
Figure 3:
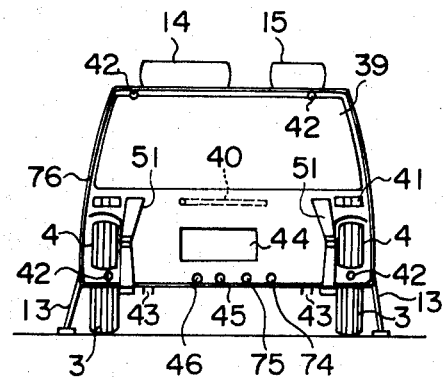
FIG. 3 is a rear view, in partly diagrammatical form, of the FF car which is to be incorporated in the first exemplary constructional example of the combination car according to the above described construction, shown in FIGS. 1 and 2.
Figure 4:
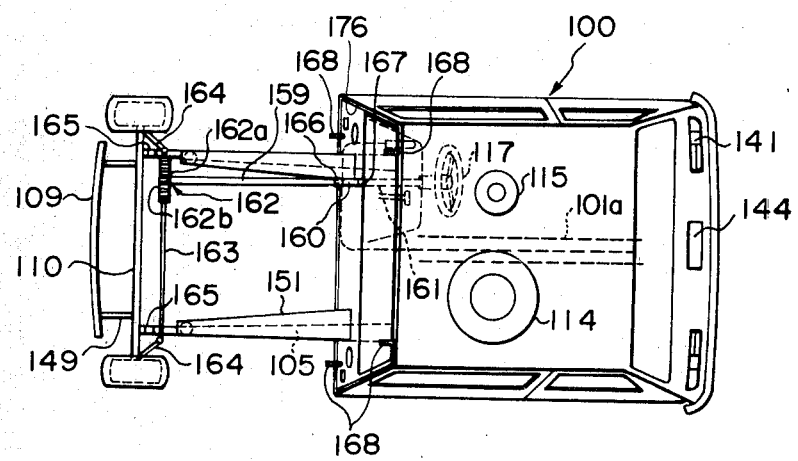
FIG. 4 is a plan view, in partly diagrammatical form, of an RR car which is to be incorporated in the first exemplary constructional example of the combination car according to the above described construction.
Figure 5:
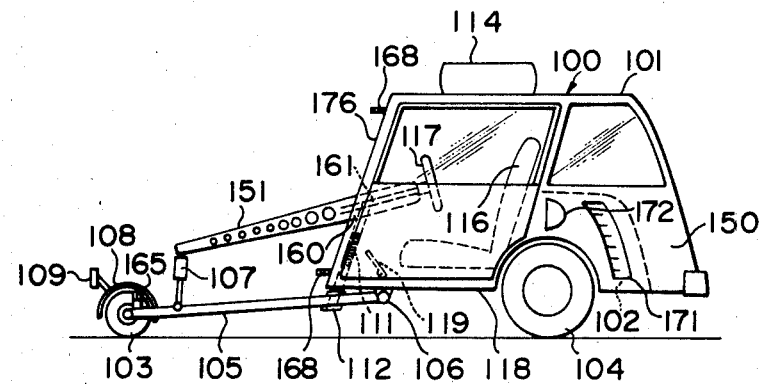
FIG. 5 is a side view, in partly diagrammatical form, of the RR car which is to be incorporated in the first exemplary constructional example of the combination car according to the above described construction, shown in FIG. 4.
Figure 6:
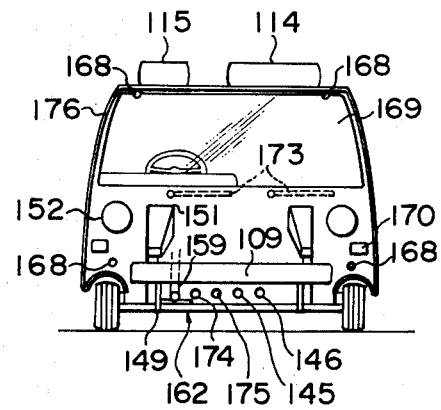
FIG. 6 is a front view, in partly diagrammatical form, of the RR car which is to be incorporated in the first eexemplary constructional example of the combination car according to the above described construction, shown in FIGS. 4 and 5.
Figure 7:
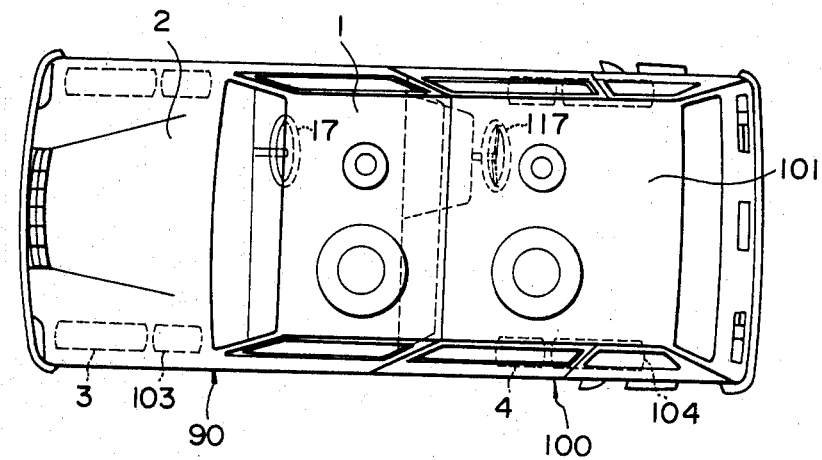
FIG. 7 is a plan view, in partly diagrammatical form, of the first exemplary constructional example of the combination car according to the above described construction, which is formed by coupling together the FF car shown in FIGS. 1, 2, and 3, and the RR car shown in FIGS. 4, 5, and 6, so as to form a coupled car.
Figure 8:
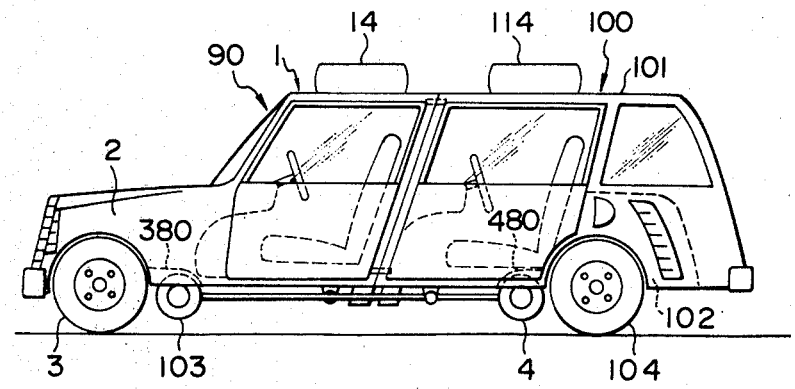
FIG. 8 is a side view, in partly diagrammatical form, of the first exemplary constructional example of the combination car according to the above described construction shown in FIG. 7.

FIGS. 1–8 show the general construction of a first exemplary constructional example of the combination car system: FIGS. 1–3 show the first or front car in plan, side, and rear views, respectively; FIGS. 4–6 show the rear or second car in plan, side, and front views, respectively; and FIGS. 7 and 8 show the combination car formed by coupling together the first car and the second car in plan and side views, respectively.

The first car

The first or front car, in this first exemplary constructional example, is generally designated by the reference numeral 90, and is a front engine front wheel drive car, i.e. a so called FF car. It is essential to the concept of the combination car that the first car be driven by its front wheels, and it is preferable that also the engine thereof should be mounted in the front thereof. Accordingly, the body 1 of the first car 90 is formed in its front portion with an engine compartment 2, within which an engine, a transmission, and a transaxle assembly, none of which are shown in the drawings, are fitted. This engine, transmission, and transaxle assembly are arranged to drive the front wheels 3 of the FF car 90. The transmission may be either a manual transmission incorporating a clutch assembly, or alternatively may be an automatic gearbox. However, it is contemplated that the front car should be mainly used by a member of the family who commutes to and fro between home and office or workplace, and accordingly, because the FF car 90 is likely to be used for moderately long distances, and because a working member of the family is more likely to be mechanically minded and therefore is more likely to be familiar with and accustomed to the operation of a manual transmission with a clutch, in consideration of fuel economy it is considered to be preferable for the transmission of the FF car 90 to be a manual transmission with a clutch. The engine, the transmission, and the transaxle assembly of this FF car 90 are per se well known and conventional, and accordingly are not shown in the figures.

The body 1 of the FF car 90 has the general shape of the front half of a normal motor vehicle body. Because of safety considerations, in order to provide proper stability and ridability for the FF car 90, when it is being operated independently, it is necessary to provide a certain minimum length of wheelbase therefor. Accordingly, out of the back of the FF car 90 there protrudes a strut assembly which carries the rear wheels 4 of the FF car 90. Thus, when the FF car 90 is being operated independently, it runs on its front wheels 3 and its rear wheels 4. It is considered desirable that the rear wheels 4 be of a smaller diameter than the front wheels 3, from considerations of convenience when the rear wheels 4 are to be stowed away, when the FF car 90 is coupled to the RR car 100 as will be described later.

In more detail, a pair of leaf springs 5 are hinged to the rear of the lower part of the body 1 of the FF car 90 by hinges 6, and extend backwards therefrom. In this first exemplary constructional example of the combination car, in fact, the fixing points of the hinges 6 are under the floor of the body 1 of the FF car 90, a little forward of the rear edge of this floor. The rear ends of these left and right leaf springs 5 are detachably coupled to a lateral link 10 via joints 48, and on the outside sides of these joints 48 there are mounted the left and right rear wheels 4. Accordingly, by the flexing of the leaf springs 5, the rear wheels 4 may move upwards and downwards, to accomodate irregularities in road surface or the like. Above the rear suspension leaf springs 5, to the rear face of the body 1 of the FF car 90, there are detachably attached brackets 51, which extend backwards and whose rear ends are coupled to the upper ends of a pair of shock absorbers 7, the lower ends of which are detachably connected to the leaf springs 5 near to their rear ends, in order to damp the upwards and downwards motion of the rear wheels 4. A rear bumper 9 is attached to the lateral link 10 by left and right stays 49, and, further, rear fenders 8 are mounted over the rear wheels 4 to guard against mud and stones and the like flying off therefrom, said rear fenders 8 being fixed to the rear suspension leaf springs 5 by stays or the like which are not shown in the figures.

As an alternative mode of construction, it would be possible for the members 5 to be, not leaf springs, but instead rigid beams such as steel tubes or the like. In this case, compression coil springs would be disposed around the shock absorbers 7, in order to provide rear suspension cushioning for the rear wheels 4, and the upper ends of these compression coil springs would bear against the brackets 51, which would thus bear the entire weight applied to the rear wheels 4. Either of these constructions is practicable.

The reference numeral 11 denotes a pair of rear suspension adjusters. Each of these is constructed as a screw type jack, and the upper ends of these rear suspension adjusters 11 are fixed to the body 1 of the FF car 90, while their lower ends are engaged one with each of the left and the right rear suspension leaf springs 5, via engaging elements 12. By operation of these screw type rear suspension adjusters 11, the riding height of the rear of the vehicle body 1 of the FF car 90 may be adjusted, and, when the FF car 90 is to be used independently, this adjustment is normally carried out so that the body 1 thereof is approximately horizontal.

Two support jacks 13 are also provided at the rear of the body 1 of the FF car 90. When these jacks are lowered so as to contact the road surface, as shown in FIG. 2, then, by operation of the rear suspension adjusters 11, the rear wheels 4 may be lifted up away from road contact, as shown by the phantom lines in FIG. 2, by the leaf springs 5 being pivoted around the hinges 6. In this condition, the entire weight of the rear portion of the FF car 90 is supported on the support jacks 13. This is the position shown in FIG. 3, which is a rear view of the FF car 90. In this figure, the rear wheels 4 are somewhat raised above the ground, and the support jacks 13 are extended so as to support the rear of the vehicle body 1.

The reference numeral 17 denotes a steering wheel, which is coupled in a per se conventional fashion to the front wheels 3 of the FF car 90 so as to steer them. 16 designates the seat of the FF car 90, and 19 is an accelerator pedal thereof, which controls the engine thereof (not shown) via a bell crank arm 20 and an accelerator cable 27, as will be more particularly described later. The reference numerals 14 and 15 denote, respectively, a front spare tire and a rear spare tire; both of these are needed because, as explained above, it is preferred that the rear wheels 4 should be substantially smaller in diameter than the front wheels 3. Particularly referring to FIG. 3, the reference numeral 39 denotes a rear window glass of the FF car 90, and this glass is lowerable downwards by a window regulating system not shown in the figures. 40 denotes a rear window wiper system for keeping the rear window 39 clean and transparent during rainy conditions or the like, and in this exemplary constructional example is constructed as a concealed wiper, which, when not in use, is stowed away within the vehicle body 1. 41 is a combination rear lamp, which combines in one unit a running lamp, a stop lamp, a winker lamp, and a backup lamp. 44 is a construction for fixing a license plate. All of these elements are so constructed that, as seen from the side as shown in FIG. 2, they are effectively flush with the rear face panel of the vehicle body 1.

In the rear of the vehicle body 1 there are provided four fixing holes 42, approximately at the four corners of the rear face thereof, for receiving corresponding bolts 168 provided on the RR car 100, when the FF car 90 and the RR car 100 are to be coupled together, as will be explained later. The reference numerals 43 denote left and right guide rails, which receive guides 165 provided at the front ends of front suspension leaf springs 105 which support the front wheels 103 of the RR car 100, when the FF car 90 and the RR car 100 are to be coupled together, as will be explained later. 45, 46, 74, and 75 are holes formed at the lower edge of the rear face panel of the FF car 90, for transmitting various control functions to the RR car 100, when the RR car 100 is coupled to the FF car 90, as will be more particularly explained later. In more detail, 45 is a hole for passing a Bowden cable 28 conducted through a floor tunnel 1a from the accelerator pedal 19 of the FF car 90 to the RR car 100, said Bowden cable 28 forming part of an embodiment of the engine control system according to the present invention; 46 is a hole for passing an electrical circuit connector for connecting together the operations of the electrical systems of the FF car 90 and the RR car 100, such as the running lights, the stop lights, the winker lights, the backup lights, and the like, in order to synchronize these various functions in the RR car 100 with the corresponding functions in the FF car 90, when the FF car 90 and the RR car 100 are to be coupled together to form the combination car, as will be described later; 74 is a hole for passing a brake link 206 which transmits brake pedal movement from the FF car 90 to the RR car 100, when the FF car 90 and the RR car 100 are to be coupled together, as will be described later; and 75 is a hole for passing an electrical connection for synchronizing the operation of the gearbox in the RR car 100 with the operation of the gearbox in the FF car 90, when the FF car 90 and the RR car 100 are to be coupled together, as will be explained later. Finally, around the entire periphery of the rear face panel of the FF car 90 there runs a sealing type weather strip 76, for sealing against the front face panel of the RR car 100, when the FF car 90 and the RR car 100 are to be coupled together, as will be explained later.

The second car

Referring particularly to FIGS. 4-6, the second or rear car will now be described. This car is designated by the reference numeral 100, and the body 101 thereof has the general appearance of the rear half of the body of a normal or conventional motor vehicle. It is essential that the rear wheels 104 of this second car should be its driven wheels, and it is preferable that the engine of the rear car 100 should be located in the rear thereof. Accordingly, in the shown exemplary constructional example, an engine compartment 102 is provided in the rear of the body 101 of the rear car 100, and thus this second car is a rear engine rear wheel drive car, i.e. a so called RR car. As a matter of course, associated with this engine (which is not shown) of the RR car 100, there are also provided a transmission and a transaxle assembly, which are not shown either in the figures, because they are per se well known and conventional. These units are all located behind the seat 116 of the RR car 100. Further, to the rear of the engine compartment 102 there is provided a luggage compartment 150.

From considerations of minimum wheelbase requirement for proper stability and drivability of the RR car 100, similarly to the FF car 90, the front wheels 103 of the RR car 100 are mounted on a strut assembly projecting from the front of the body 101 of the RR car 100, after a construction similar to the FF car 90. From considerations of convenience of stowability when the RR car 100 is to be coupled to the FF car 90, it is preferable that the front wheels 103 should be of a smaller diameter than the rear wheels 104, although this is not absolutely essential. Conveniently, the size of these front wheels 103 of the RR car 100 may be the same as that of the rear wheels 4 of the FF car 90, and, similarly, the size of the rear wheels 104 of the RR car 100 may conveniently be the same as the size of the front wheels 3 of the FF car 90.

In more detail, two front suspension leaf springs 105 extend forwards from under the front of the body 101 of the RR car 100, to the front ends of which the front wheels 103 are mounted; in fact, the rear ends of these leaf springs 105 are hinged via hinges 106 to the front part of the underneath of the floor of the body 101 of the RR car 100. Two front suspension adjusters 111 are provided, of a screw jack construction similar to the construction of the rear suspension adjusters 11 of the FF car 90, and are coupled to the leaf springs 105 via mounting members 112 at their lower ends. Thus, by adjusting the front suspension adjusters 111, the angular position of the leaf springs 105 may be altered with respect to the body 101 of the RR car 100. Thus, when the RR car 100 is being operated as an independent motor vehicle, the riding height of the front thereof may be adjusted by adjusting these front suspension adjusters 111. Above the leaf springs 105, there are detachably attached two brackets 151 to the front face of the body 101 of the RR car 100, and between the front ends of these brackets 101 and forward portions of the leaf springs 105 there are detachably fitted a pair of shock absorbers 107, in order to damp the upward and downward motion of the leaf springs 105 and thus to provide good driving stability and ridability for the RR car 100. Similarly to the case in the FF car 90, as an alternative possible construction, the members 105 could be constructed as rigid members such as steel bars, rather than as resilient members such as leaf springs, and in this case it would be necessary to provide compression coil springs or the like arranged around the shock absorbers 107, with the upper ends of these compression coil springs bearing against the brackets 151 and their lower ends bearing against the rigid members 105, and these compression coil springs would then fulfil the same function as do the leaf springs 105 in the shown first exemplary constructional example of the combination car. Either of these constructions would be acceptable.

The steering arrangements for the RR car 100 will now be explained in more detail. Referring particularly to FIG. 4, 110 denotes a solid front axle, at the ends of which the front wheels 103 are pivotally attached via kingpins and knuckles, neither of which are shown in the figures. The steering wheel 117 of the RR car 100 is connected to the rear end of a first steering shaft 161, the front end of which is connected to a first universal joint 167 which is located approximately in the plane of the dash panel of the RR car 100. A second steering shaft 160 extends downwards from this first universal joint 167, generally in the plane of the dash panel of the RR car 100, and terminates at a second universal joint 166 located at or slightly below the floor of the RR car 100. From the second universal joint 166 there extends forwards a third steering shaft 159, towards the front axle 110; this shaft 159 is not visible in FIG. 5, because it is behind the left leaf spring 105. Thus, none of these steering members projects frontwards from the body 101 of the RR car 100 above its floor level. The front end of the third steering shaft 159 is connected to a pinion 162a of a rack and pinion steering assembly 162, the rack 162b of which incorporates a tie rod 163. Left and right ends of this tie rod 163 are connected to knuckle arms 164 which are fixed to the front wheels 103 of the RR car 100. Accordingly, is a per se well known fashion, by turning of the steering wheel 117 to the right or to the left, the front wheels 103 may be steered to the right or to the left, by driving the tie rod 163 leftwards or rightwards, respectively.

A front bumper 109 is connected via two stays 149 to the front axle 110, in a detachable fashion. Further, over the front wheels 103, there are detachably attached a pair of fenders 108, by constructions which are not shown in the figures.

The reference numerals 114 and 115 denote spare tires for, respectively, the rear wheels 104 and the front wheels 103 of the RR car 100, and these spare tires 114 and 115 are mounted on the roof of the body 101 of the RR car 100. The reference numerals 171 and 172 denote air intake holes for, respectively, a rear engine radiator and a rear engine air cleaner, neither of which are shown in the figures.

On the front ends of the leaf springs 105 there are mounted guides 165 which extend somewhat upward therefrom, in a fashion so as to be able to engage with the guides 43 provided on the underside of the body 1 of the FF car 90, as will be more clearly explained later. It should be particularly noted that, corresponding to this, the distance apart of the leaf springs 105 of the front suspension of the RR car 100 should be somewhat smaller than the distance apart of the inner parts of the rear wheels 3 of the FF car 90. From the front face of the body 101 of the RR car 100 there project four fixing bolts 168, in positions corresponding to the positions of the four fixing holes 42, previously mentioned, provided on the rear face of the body 1 of the FF car 90. Referring particularly now to FIG. 6, a windshield 169 of the RR car 100 is arranged to be lowerable downwards by a window regulator not shown in the figures, and a concealed type wiper arrangement 173 is provided for cleaning this windshield 169 during rainy conditions or the like. The reference numeral 152 denotes a head lamp, and the reference numeral 170 denotes a combination running lamp and indicator lamp. Four holes 146, 145, 175, and 174 are provided in the front face panel of the body 101 of the RR car 100, in positions corresponding, respectively, to the holes 46, 45, 75, and 74 formed on the rear face panel of the body 1 of the FF car 90, when these respective faces of the RR car 100 and the FF car 90 are brought together into contact. Thus, the hole 146, which corresponds to the hole 46 in the FF car 90, is for passing an electrical circuit connector for connecting the electrical systems of the FF car 90 to the electrical systems of the RR car 100, i.e. systems such as the running lamps, the stop lamps, the winker lamps, the backup lamps, and so on. The hole 145, which corresponds to the hole 45 on the FF car 90, is for passing a Bowden cable 28 of the accelerator linkage of the combination car system, said Bowden cable 28 forming part of an embodiment of the engine control system according to the present invention, as will be more fully described hereinafter. The hole 174, which corresponds to the hole 74 of the FF car 90, is for passing a brake pedal movement transmission link 206 for controlling the braking system of the RR car 100 from the FF car 90, when the RR car 100 and the FF car 90 are coupled together into the combination car, as will be more particularly described hereinafter. Finally, the hole 175, which corresponds to the hole 75 on the FF car 90, is for passing an electrical connector conducting electrical signals for the purpose of controlling the transmission of the RR car 100 from the driver's seat 16 of the FF car 90, as will also be more particularly described hereinafter.

It is preferable for the proper operability of the combination car that this transmission in the RR car 100 should be an automatic transmission. It is contemplated that the RR car 100 should be more particularly adapted for use by a home making family member who stays at home and performs short local errands such as taking children to and fro between home and school, shopping, and the like, and since such a person is generally not particularly mechanically minded, and is not generally particularly used to or happy with the operation of a manual transmission with a clutch, it is envisaged for ease of operation that the RR car 100 should have an automatic transmission. Further, it is desirable for proper operability of the combination car that the transmissions and the engines thereof should be controlled in unison, because if this is not so the front and the rear wheels thereof will be at odds with one another when the combination car is in motion, which is very harmful for smooth driving. If both the FF car 90 and the RR car 100 are provided with manual transmissions, it is very difficult properly to synchronize the operation of their engines and their transmissions. On the other hand, if at least one of these transmissions is an automatic transmission, the torque converter thereof will smooth any slight imbalance between the front and the rear wheel drives of the combination car, and this is very beneficial for smooth operation of the combination car.

The reference numeral 144 denotes a licence plate fixing portion. The reference numeral 141 denotes a combination rear running lamp, stop lamp, indicator lamp, and backup lamp. A weather strip 176 is provided all around the front face panel of the RR car 100, for sealing against the rear face panel of the FF car 90, when the RR car 100 and the FF car 90 are joined together into the combination car.

The combination car

The FF car 90 and the RR car 100 previously described are each of them in itself quite capable of running on its own, although it will be readily understood by one skilled in the art that their operational characteristics at high speed and for long distances leave something to be desired. However, it is not envisaged that these cars will be used for extended cruising at high speeds such as on an expressway or the like, but will rather be predominantly used for medium and short distance journeys. When, on the other hand, it is desired to have a large and impressive motor vehicle of high capacity, capable of accomodating four or five people and a reasonable amount of luggage, and capable of cruising for long distances at high speed such as on an expressway, then the FF car 90 and the RR car 100 are coupled together, as will now be explained, into a combination car.

For this coupling, first it is ensured that both the FF car 90 and the RR car 100 are riding with their floor panels substantially horizontal, by proper adjustment of the rear suspension adjusters 11 of the FF car 90 and of the ront suspension adjusters 111 of the RR car 100. Next, on the FF car 90, the brackets 51 are detached from the back face of the body 1 thereof, and, concurrently with this, the lower ends of the shock absorbers 7 are detached from connection with the rear suspension leaf springs 5. Similarly, on the RR car 100, the detachable brackets 151 are removed from the front face of the body 101 thereof, and concurrently with this the lower ends of the shock absorbers 107 are detached from the front suspension leaf springs 105 thereof. These brackets 51 and 151, and the shock absorbers 7 and 107, may be conveniently stored in the storage space 150 provided to the rear of the rear engine compartment 102 in the body 101 of the RR car 100.

Next, the rear fenders 8 and the rear bumper 9 and the lateral link 10 of the FF car 90 are removed from its rear suspension, by detaching the joints 48 thereof, and are similarly stored; and also the front bumper 109 and the front fenders 108 of the RR car 100 are removed from the front thereof, and are similarly stored. Next, the body support jacks 13 of the FF car 90 are lowered downwards, so as to come into contact with the road surface, and so as to support the rear of the body 1 of the FF car 90, and when this has been done then the rear suspension adjusters 11 of the FF car 90 are adjusted so as to lift the rear wheels 4 thereof quite high into the air, up to their positions shown in FIG. 2 by phantom lines, wherein their bottom portions are higher away from the road surface than are the top portions of the front wheels 103 of the RR car 100. It should be noted that these body support jacks 13 of the FF car 90 extend somewhat sideways and outwards from the body 1 thereof, so as to be further apart from one another than the extreme distance between the outside portions of the front wheels 103 of the RR car 100. Next, with the rear wheels 4 of the FF car 90 in this high raised position, the RR car 100 is approached towards the back of the FF car 90. When the front wheels 103 of the RR car 100 have approached so far towards the rear of the FF car 90 that they have passed underneath the rear wheels 4 of the FF car 90, then the rear suspension adjusters 11 of the FF car 90 are adjusted so as to bring the rear wheels 4 thereof down into road contact. This is possible because the distance between the inside portions of the rear wheels 4 of the FF car 90 is greater than the distance between the outside portions of the front suspension leaf springs 105 of the RR car 100, as heretofore explained, and accordingly the rear wheels 4 of the FF car 90 fit outside these front suspension springs 105 of the RR car 100. Next, the RR car 100 is approached forwards towards the rear of the FF car 90, until the guides 165 on the front upper portions of the front suspension springs 105 of the RR car 100 engage with the guide rails 43 which are attached under the body 1 of the FF car 90 and engage therewith. Next, the RR car 100 is approached closer towards the FF car 90, with these guides 165 sliding along the guide rails 43, and this approaching movement continues until the front face panel of the body 101 of the RR car 100 comes into contact with the rear face panel of the body 1 of the FF car 90, with the four fixing bolts 168 provided on the front face of the body 101 of the RR car 100 entering into the four fixing holes 42 provided on the rear face of the body 1 of the FF car 90. If necessary, at this time the exact correspondence of the front face of the body 101 of the RR car 100 and of the rear face of the body 1 of the FF car 90 may be positively assured by adjusting the body support jacks 13 and/or the rear suspension adjusters 11 of the FF car 90, and the front suspension adjusters 111 of the RR car 100. When all of the bolts 168 have properly entered into their corresponding holes 42, then nuts (not shown) are fitted onto these bolts 168 so as positively to attach together the RR car 100 and the FF car 90, and these nuts are tightened. Thus the vehicle body 1 of the FF car 90 and the vehicle body 101 of the RR car 100 are tightly and immovably attached together.

Next, the body support jacks 13 of the FF car 90 are raised up out of the way, and then the rear suspension adjusters 11 of the FF car 90 and the front suspension adjusters 111 of the RR car 100 are raised, so as to raise, respectively, the rear suspension leaf springs 5 and the rear wheels 4 of the FF car 90, and the front suspension leaf springs 105 and the front wheels 103 of the RR car 100. The upper parts of the rear wheels 4 of the FF car 90 and the upper parts of the front wheels 103 of the RR car 100 enter, respectively, into rear wheel housings 480 provided on the underside of the body 101 of the RR car 100, just in front of the rear wheels 104 thereof, and into front wheel housings 380 provided on the underside of the body 1 of the FF car 90, just behind the front wheels 3 thereof; thereby, it is possible for the front suspension leaf springs 105 of the RR car 100 to be brought close up against the underside of the body 1 of the FF car 90, and, correspondingly, for the rear suspension leaf springs 5 of the FF car 90 to be brought close up against the underside of the body 101 of the RR car 100. This ensures good road clearance below the front wheels 103 of the RR car 100 and the rear wheels 4 of the FF car 90.

Next, after this physical linking of the FF car 90 to the RR car 100 has been performed, the rear window 39 of the FF car 90 is lowered by operation of its window regulator, and, correspondingly, the front windshield 169 of the RR car 100 is lowered by operation of its windshield regulator. Thereby, the interiors of the FF car 90 and of the RR car 100 are communicated with one another, to allow good socialization between people sitting in the seat 16 of the FF car 90 and people sitting in the seat 116 of the RR car 100; this promotes good family relationships, and if, as is often the case, the adult members of the family travel in the front seat 16 of the combination car, i.e. in the seat 16 of the FF car 90, and the children of the family travel in the rear seat 116 of the combination car, i.e. in the seat 116 of the RR car 100, then this allows for good controllability of the children by the adults, by allowing for physical communication between the coupled passenger compartments of the FF car 90 and the RR car 100.

Next, via the holes 45 and 145 which are opposed, according to the present invention, the accelerator pedal linkage of the FF car 90 is coupled to the accelerator pedal linkage of the RR car 100, as will be more particularly described hereinafter. Next, via the holes 46 and 146 which are opposed, various electrical circuits of the FF car 90 are coupled to various electrical circuits of the RR car 100; this will not be further described herein, because the details thereof will be clear to one skilled in the art, based upon the descriptions contained herein. Next, via the holes 74 and 174 which are opposed, the braking system of the FF car 90 is coupled to the braking system of the RR car 100, as will be more particularly described hereinafter. Next, via the holes 75 and 175 which are opposed, the operations of the transmissions of the FF car 90 and of the RR car 100 are connected, as will be more particularly described hereinafter. A good seal is provided between the body 1 of the FF car 90 and the body 101 of the RR car 100, by the weather strips 76 and 176 provided on the opposing faces of these vehicle bodies, which seal well against one another, and which thus prevent the entrance of rain, snow, dust or the like into the interior of the combination car.

By the construction of the front steering linkage of the RR car 100 out of the three steering shafts 159, 160, and 161, thereby when the RR car 100 is to be coupled to the FF car 90 these steering shafts do not impede this coupling. Although the steering wheel 117 of the RR car 100 is, in this shown exemplary constructional example, left in place, and of course the control thereby of the front wheels 103 of the RR car 100, when the FF car 90 and the RR car 100 are coupled together to form the combination car, has no effect upon the driving of the combination car, in another construction it might be considered preferable for the steering wheel 117 and the steering shaft 161 to be removable, or perhaps pivotable downwards towards the floor of the RR car 100, in order to provide for more space in the passenger compartment thereof, during usage of the combination car.

THE ENGINE CONTROL SYSTEM

In FIGS. 9–15, a novel engine control system is shown for the combination car system, according to a first preferred embodiment of the present invention. According to the operation of this engine control system, when the FF car 90 and the RR car 100 are running independently, then the accelerator pedal 19 of the FF car 90 is operative to control the engine of the FF car 90 only, and similarly the accelerator pedal 119 of the RR car 100 is operative to control the engine of the RR car 100 only. On the other hand, when the FF car 90 and the RR car 100 are coupled together to form the combination car, then the engine control system is put into its operational mode wherein the accelerator pedal 19 of the FF car 90 is operative to control both the engine of the FF car 90 and also the engine of the RR car 100, while the accelerator pedal 119 of the RR car 100 is disabled, so that it is not operative to control anything. Thus, the combination car may be controlled by a person sitting in the seat 16 of the FF car 90, i.e. in the front seat 16 of the combination car. On the other hand, a person sitting in the rear seat 116 of the combination car, i.e. in the seat 116 of the RR car 100, will not be able to exert any control function on either of the engines of the combination car.

In more detail, the base of the accelerator pedal 19 is pivotally attached to a part of the floor 18 of the FF car 90, and to a part of the dash panel 22 of the FF car 90 there is mounted a bracket 21. Around a pivot axis 20a there is pivotally mounted to the bracket 21 a bell crank 20, the end of one arm of which is engaged with the end of the accelerator pedal 19 remote from the hinged portion where said accelerator pedal 19 is pivoted to the floor 18 of the FF car 90. To the end of the other arm of the bell crank 20, i.e. the uppermost arm in FIG. 9, there is attached a clevis 23.

To the dash panel 22 there is also mounted a support 26, through which pass the inner cables 24 and 25 of two Bowden cables. The ends of these Bowden inner cables 24 and 25 are coupled to the clevis 23, on the passenger compartment interior side of the dash panel 22, and on the passenger compartment exterior side of the dash panel 22 these inner cables 24 and 25 extend into, respectively, outer Bowden cables 27 and 28.

Referring to the first Bowden cable which comprises the inner cable 24 and the outer cable 27, at its end remote from the clevis 23 the inner cable 24 protrudes from the outer cable 27 and to it there is fixed a nipple 32. To the side of the outer Bowden cable 27, a sheath piece 33 is abutted to the nipple 32, and extends over the extreme end in the leftward direction in FIG. 9 of the outer Bowden cable 27, so as to prevent the ingress of dust, dirt, or the like into the gap between the inner cable 24 and the outer cable 27; this sheath piece 33 moves along with the nipple 32, as the inner cable 24 moves to and fro with respect to the outer cable 27, sliding over the outside of the tip portion of the outer cable 27. Similarly, at the end of the second Bowden cable comprising the inner cable 25 and the outer cable 28 remote from the clevis 23 the inner cable 25 protrudes from the outer cable 28 and to it there is fixed a nipple 36. To the side of the outer Bowden cable 28, a sheath piece 37 is abutted to the nipple 36, and extends over the extreme end in the leftward direction in FIG. 9 of the outer Bowden cable 28, so as to prevent the ingress of dust, dirt, or the like into the gap between the inner cable 25 and the outer cable 28; this sheath piece 37 moves along with the nipple 36, as the inner cable 25 moves to and fro with respect to the outer cable 28, sliding over the outside of the tip portion of the outer cable 28.

Next, in the RR car 100, the base of the accelerator pedal 119 is pivotally attached to a part of the floor 118 of the RR car 100, and to a part of the dash panel 122 of the RR car 100 there is mounted a bracket 121. Around a pivot axis 120a there is pivotally mounted to the bracket 121 a bell crank 120, the end of one arm of which is engaged with the end of the accelerator pedal 19 remote from the hinged portion where said accelerator pedal 119 is pivoted to the floor 118 of the RR car 100. To the end of the other arm of the bell crank 120, i.e. the uppermost arm in FIG. 12, there is attached a clevis 123.

To the dash panel 122 there is also mounted a support 126, through which passes the inner cable 124 of a Bowden cable. The end of this Bowden inner cable 24 is coupled to the clevis 123, on the passenger compartment inner side of the dash panel 122, and on the passenger compartment exterior side of the dash panel 122 this inner cable 124 extends into an outer Bowden cable 127.

At the end of this Bowden cable remote from the clevis 123, the inner cable 124 protrudes from the outer cable 127 and to it there is fixed a nipple 149. To the side of the outer Bowden cable 127, a sheath piece 148 is abutted to the nipple 149, and extends over the extreme end in the downward direction in FIG. 12 of the outer Bowden cable 127, so as to prevent the ingress of dust, dirt, or the like into the gap between the inner cable 124 and the outer cable 127; this sheath piece 148 moves along with the nipple 149, as the inner cable 124 moves to and fro with respect to the outer cable 127, sliding over the outside of the tip portion of the outer cable 127.

In the FF car 90, the engine thereof incorporates, in this particular exemplary constructional example of the combination car system, a carburetor not shown in the drawings, the intake passage opening of which, which determines the power output of the engine of said FF car 90, is controlled by the rotational movement of a throttle valve attached to a throttle shaft, which are also not shown in the drawings. To this throttle shaft there is fixed a throttle arm 34, which is biased in the counterclockwise direction in FIG. 9, i.e. in the rotational direction to close the intake passage of the aforesaid carburetor, by a tension coil spring 31, one end of which is connected to said throttle arm 34, while its other end is connected to a bracket 47 which is mounted on the aforesaid carburetor. The throttle arm 34 is fixed to the aforesaid throttle shaft by a hole 30 provided in the throttle arm 34. Further, on the throttle arm 34 there is provided a pin 35 formed with a ball head. A clip 29 is formed as a generally hollow cylindrical piece with a longitudinal side slot, and with a generally part spherical ball receiving portion 62, most clearly visible in FIG. 11, which is adapted to engage with the ball head of said pin 35. The end of this clip 29 is force fitted over the nipple 32 on the end of the inner cable 24 of the aforesaid first Bowden cable, and the ball receiving portion 62 of the clip 29 is clipped over the head of said pin 35. Thus, the clip 29 moves to and fro along with the inner cable 24 of the first Bowden cable, and clips this inner Bowden cable 24 to the pin 35 so as, according to the movement of said inner cable 34, to rotate the throttle shaft of the carburetor to and fro to open and close the carburetor intake passage. Adjustment of the relative positions of the inner cable 24 and the throttle arm 34, i.e. of the rotational position of the aforesaid throttle shaft, may be carried out by changing the positional engagement of the clip 29 with respect to the nipple 32.

Similarly, in the RR car 100, the engine thereof incorporates, in this particular exemplary constructional example of the combination car system, a carburetor not shown in the drawings, the intake passage opening of which, which determines the power output of the engine of said RR car 100, is controlled by the rotational movement of a throttle valve attached to a throttle shaft, which are also not shown in the drawings. To this throttle shaft there is fixed a throttle arm 134, which is biased in the clockwise direction in FIG. 12, which is the rotational direction to close the intake passage of the aforesaid carburetor, by a tension coil spring 131, one end of which is connected to said throttle arm 134, while its other end is connected to a bracket 47 which is mounted on the aforesaid carburetor. The throttle arm 134 is connected to the aforesaid throttle shaft by a hole 130 provided in the throttle arm 134. Further, on the throttle arm 134 there is provided a pin formed with a ball head, which cannot be seen in FIG. 12, because it is behind a clip 129 to be described later, but which serves as a driving member for the throttle arm 134.

A clip 38 is provided as force fitted over the nipple 36, and a clip 150 is provided as force fitted over the nipple 149; these clips 38 and 150 are of exactly the same form as the clip 29 which is fitted to the nipple 32, and hence detailed description thereof will be omitted to avoid duplication.

According to this construction, the assembly comprising the bell crank 20, the first Bowden cable comprising the inner cable 24 and the outer cable 27, and the clip 29, etc., constitutes a first displacement transmission mechanism which transmits displacement of the first accelerator pedal 19 of the FF car 90 to the engine output control element 34 which controls the engine output of the engine of the FF car 90.

The output cable 27 of the first Bowden cable is fixed to the body 1 of the FF car 90 by a suitable clip such as 63, so as to be steadily held. Similarly, the outer cable 28 of the second Bowden cable is fixed to the body 1 of the FF car 90 by another suitable clip such as 63, so as to be steadily held. This outer cable 28 of the second Bowden cable, more exactly, extends through a floor tunnel 1a provided along the floor 18 of the body 1 of the FF car 90, and its lower end, over which the sheath 37 fits, just projects through the hole 45, which is formed, as previously described, at the bottom edge of the rear end face panel of the FF car 90, so as to oppose the hole 145 formed on the lower edge of the front end face panel of the RR car 100, when the FF car 90 and the RR car 100 are coupled together to form the combination car. When the FF car 90 is being operated independently, however, of couse the second Bowden cable incorporating the inner cable 25 and the outer cable 28 will have no substantial function. However, although the extreme end at this time of this second Bowden cable will protrude slightly from the hole 45 to the outside of the FF car 90, the provision of the sheath 37 will ensure that no substantial quantity of undesirable contaminants such as rain, dust, dirt, or the like can enter between the inner cable 25 and the outer cable 28 to disturb its functioning by causing jamming, corrosion, or the like.

Within the RR car 100, a connection unit is constructed as follows. To a part of the floor 118 of the body 101 of the RR car 100, near the inside side of the hole 145 formed in the lower edge of the front end face panel of this body 101, there is attached a support 151, to which there is pivotally mounted, by a pin 321, one end of a lever 152. A clevis 155 is attached to this lever 152 remote from its pivotal axis, and one end of an inner Bowden cable 156 is connected to this clevis 155. The inner cable 156 passes into an outer Bowden cable 157, the left hand end of which in FIG. 12 is supported by a support 158 which is fixed to the floor 118 of the body 101 of the RR car 100, and the other end of the inner cable 156 is connected to a nipple 132. To the side of the outer Bowden cable 157, a sheath piece 133 is abutted to the nipple 132, and extends over the extreme end in the rightward direction in FIG. 12 of the outer Bowden cable 157, so as to prevent the ingress of dust, dirt, or the like into the gap between the inner cable 156 and the outer cable 157; this sheath piece 133 moves along with the nipple 132, as the inner cable 156 moves to and fro with respect to the outer cable 157, sliding over the outside of the tip portion of the outer cable 157. Further, over the end of the nipple 132, there is force fitted one end of a clip 129, which is of exactly the same shape as the clip 29 fitted to the nipple 32, and of which, therefore, further description will be omitted in the interests of brevity of description. This clip 129 is clipped over the ball head of the ball head pin, already mentioned, which cannot be seen in FIG. 12, but which is behind the clip 129, and is mounted to the throttle arm 134 so as to drive it. It should be noted that adjustment of the relative positions of the inner cable 156 and the throttle arm 134, i.e. of the rotational position of the aforesaid throttle shaft, may be carried out by changing the positional engagement of the clip 129 with respect to the nipple 132.

Further, to a position on the lever 152 remote from the pivotal axis of the fixing pin 321 thereof, there is fitted a pin 153 which is formed with a ball head. This pin 153 is tightened within its fitting hole by a lock nut combination system, which is on the under side of the lever 152 as seen in FIG. 12, and thus is not visible in the figures.

When the RR car 100 is being operated independently, then the clip 150 is detachably engaged over the ball head portion of the pin 153, and in this condition the assembly comprising the bell crank 120 and the Bowden cable comprising the inner cable 124 and the outer cable 127 may be said to constitute a first displacement transmission submechanism, which is removably drivingly coupled to the connection unit comprising the lever 152, and which transmits displacement of the second accelerator pedal 119 of the RR car 100 to this connection unit; and, further, the Bowden cable comprising the inner cable 156 and the outer cable 157 may be said to constitute a second displacement transmission submechanism, which transmits displacement of the connection unit incorporating the lever 152 to the engine output control element 134 which controls the engine output of the engine of the RR car 100. Thus, this connection unit, this first displacement transmission submechanism, and this second displacement transmission submechanism together at this time constitute a second displacement transmission mechanism, which transmits displacement of the second accelerator pedal 119 of the RR car 100 to the engine output control element 134 thereof.

On the other hand, when it is desired to connect together the FF car 90 and the RR car 100 so as to operate them together as the combination car, then, after the physical coupling of their bodies has been consummated as explained above, then the end portion remote from the clevis 23 of the Bowden cable comprising the inner cable 25 and the outer cable 28, with the nipple 36 and the clip 38, etc., mounted thereon, which as explained above is projecting through the hole 45 formed in the lower edge of the rear end face panel of the body 1 of the FF car 90 and through the hole 145 formed in the lower edge of the front end face panel of the body 101 of the RR car 100, is approached to the lever 152, and then the clip 150 is detached from the ball head pin 153 and the Bowden cable comprising the inner Bowden cable 124 and the outer Bowden cable 127 is displaced somewhat from the lever 152, and instead the clip 38 is engaged over the ball head of the pin 153. In this operational configuration, of course the second accelerator pedal 119 of the RR car 100 is now disconnected from operating the connection unit comprising the lever 152, and the second engine output control element 134; while, on the other hand, now the Bowden cable comprising the inner Bowden cable 25 and the outer Bowden cable 28 constitutes a third displacement transmission mechanism, which is extending from a part of the abovementioned first displacement transmission mechanism comprising the bell crank 20, the inner Bowden cable 24, and the outer Bowden cable 27, to the connection unit comprising the lever 152 and the ball head pin 153, replacing the connection of the abovementioned first displacement transmission submechanism thereto, and being removably drivingly coupled thereto. In this operational mode, when the first accelerator pedal 19 of the FF car 90 is depressed, then the bell crank 20 is rotated around its axis 20a, and the clevis 23 pulls on both the inner Bowden cable 24 and the inner Bowden cable 25, whereby, via the inner Bowden cable 24, the first engine output control element 34 is rotated so as to control the engine output of the engine of the FF car 90, and also, via the inner Bowden cable 25, the clip 38 is displaced so as to pull on the pin 153 of the connection unit incorporating the lever 152, and so as thereby to pull on the inner Bowden cable 156 and the clip 129 attached thereto, so as to rotate the second engine output control element 134 so as to control the engine output of the engine of the RR car 100. This control of the engine of the RR car 100 is therefore performed in synchronization with the control of the engine of the FF car 90. Accordingly, by the operation of the engine control system according to the present invention, both the engine of the RR car 100 and the engine of the FF car 90 are operated in unison, so as to propel the combination car along the road smoothly, in a four wheel drive fashion.

With regard to adjustment of this mechanism, by adjusting the position of the clip 29 upon the nipple 32 the zero position of the first engine output element or throttle arm 34 may be adjusted with respect to the first accelerator pedal 19 of the FF car 90; and, similarly, by adjusting the position of the clip 129 on the nipple 132, the zero position of the second engine output element or throttle arm 134 may be adjusted with respect to the second accelerator pedal 119 of the RR car 100. Now, when the RR car 100 is being operated independently, it should be so arranged that the distance from the pivot axis of the fixing pin 321 coupling the lever 152 to the ball head pin 153 should be approximately the same as the distance from this pivot axis of the pin 321 to the attachment point of the pin 322 which retains the clevis 155 on the lever 152, and therefore the amount of movement of the inner Bowden cable 124 within the outer Bowden cable 127 will be approximately the same as the amount of movement of the inner Bowden cable 156 within the outer Bowden cable 157. However, the adjustment between the movement of the accelerator pedal 19 of the FF car 90 and the movement of the engine output control element or throttle arm 134 in the RR car 100 may be varied by varying the distances away from the pivot axis of the fixing pin 321, about which the lever 152 pivots, of both the ball head pin 153 and of the fitting pin 322 which retains the clevis 155 on said lever 152, and this is possible because a plurality of holes at various different positions from said pivotal axis 321 are provided through this lever 152. Thereby, by fitting the ball head pin 153 and/or the clevis pin 322 selectively to any ones of this plurality of holes, the leverage exerted therby upon the lever 152 may be altered, thus altering the ratio of the output displacement amount of the connection unit incorporating the lever 152 to its input displacement amount, with respect to its transmission of displacement from the aforementioned third displacement transmission mechanism incorporating the inner Bowden cable 25 and the outer Bowden cable 28, via the second displacement transmission submechanism incorporating the inner Bowden cable 156 and the outer Bowden cable 157, to the second engine output control element 134, when the FF car 90 and the RR car 100 are coupled together to form the combination car.

Now, an alternative possible construction for the connection unit comprising the lever 152 will be described, which thus forms part of a second preferred embodiment of the engine control system according to the present invention, wherein this adjustment of the ratio of its output and input displacement amounts may be performed continuously. This second possible construction is more particularly shown in FIGS. 13, 14, and 15. In this second possible construction, the clevis 155 is fitted by the fitting pin 322 thereof to a fixed place upon the lever 152. However, the ball head pin 353, which corresponds in function to the ball head pin 153 in the first construction shown in FIG. 12, and to which is selectively detachably removed either the clip 150 of the first displacement transmission submechanism incorporating the inner Bowden cable 124 and the outer Bowden cable 127, when the RR car 100 is being operated independently, or the clip 38 of the third displacement transmission mechanism incorporating the inner Bowden cable 25 and the outer Bowden cable 28, when the FF car 90 and the RR car 100 are being operated as coupled together into the combination car, is mounted on the end of a bar member 333. The bar member 333 is movable to the left and the right in FIGS. 13 and 14, and is slidably supported in holes formed in four collinear supports 334, 335, 336, and 337, which are mounted in that order on the lever 152, from its outward end to which the pin 322 supporting the clevis 155 is mounted, inwards towards its fixing pin 321. In more detail, in fact, the middle portion of the bar 333 is formed as a threaded member, and this portion passes through substantially circular holes formed in the two intermediate supports 335 and 336, while, on the other hand, the left hand end of the bar 333 in FIGS. 13 and 14, is formed with a polygonal cross section such as a square or rectangular cross section, which engages with a corresponding polygonal shaped hole in the end support 334, so that the bar 333 is slidable with respect to this support 334, but is not rotatable with respect to it; and the right hand end in FIGS. 13 and 14 of the threaded portion of the bar 333 is threaded into a block member 343 and clamped to said block member 343 by a lock nut 344; this block 343 is also formed with a polygonal cross section such as a square or rectangular cross section which engages with a corresponding polygonal shaped hole in the end support 337, so that the block 343 is slidable with respect to this support 337, but is not rotatable with respect to it.

In between the intermediate supports 335 and 336 there are mounted on the threaded portion of the bar 333 four nuts 338, 340, 341, and 339 in that order. The nut 340 is a lock nut for the nut 338, and the nut 341 is a lock nut for the nut 339. By rotating the nuts 338 and 339, therefore, by the bearing of these nuts against the supports 335 and 336 respectively the bar 333 may be adjusted in its lateral position to the left and the right in FIGS. 13 and 14, and may be fixed in this longitudinal position by the clamping of the lock nut 340 against the nut 338, and by the clamping of the lock nut 341 against the nut 339. At this time, as explained above, the bar 333 is not able to rotate around its longitudinal axis, because the polygonal cross section of its left hand end portion in FIGS. 13 and 14 engages with the corresponding polygonal hole formed in the support 334, and also because the polygonal cross section of the block 343 fixedly coupled to this bar 333 engages with the corresponding polygonal cross section of the hole formed in the support 337. By this longitudinal adjustability of the bar 333 with respect to the lever 152, thereby the relative position of the ball head pin 353, with respect to the fixing pin 322 which secures the clevis 155 to the lever 152, may be adjusted continuously. Thereby, the adjustment of the ratio of the amount of displacement of the engine output control element or throttle arm 134 of the RR car 100 to the amount of displacement of the first accelerator pedal 19 of the FF car 90, when the RR car 100 and the FF car 90 are being operated together as the combination car, may be performed. Thus it is possible properly to synchronize the operation of the engine of the FF car 90 with the operation of the engine of the RR car 100, during operation of the combination car as a four wheel drive vehicle. In this second preferred embodiment, this adjustment may be performed in a continuous fashion, which is very helpful for precise synchronization.

The provision of the third displacement transmission mechanism, which links together the displacement of the first accelerator pedal 19 in the FF car 90 and the displacement of the connection unit comprising the lever 152 within the RR car 100, as a Bowden cable assembly incorporating an inner cable 25 and an outer cable 28, has a particular aspect. As a refinement of the above described possible constructions, the outer cable 28 of this third displacement transmission mechanism, at its right hand end portion in FIG. 9, could be brought to bear against some part of the floor 118 of the RR car 100 relatively close to the lever 152, when the FF car 90 and the RR car 100 are being operated together as the combination car. In this case, because the operation of a Bowden cable is an operation of transmitting relative displacement amount between its inner cable and its outer cable, and is not an operation of transmitting absolute displacement amount, thereby differences in the mutual fitting positions between the body 1 of the FF car 90 and the body 101 of the RR car 100, between various engagements thereof from time to time, are automatically cancelled. In other words, there will be no requirement to adjust the engine control system every time the FF car 90 and the RR car 100 are to be coupled together, but on the contrary such an adjustment will be preserved over a considerable period of time and over many fittings together of the FF car 90 and the RR car 100.

THE TRANSMISSION CONTROL SYSTEM

In FIGS. 16–24, a novel transmission control system is shown for the combination car system. According to the operation of this transmission control system, when the FF car 90 and the RR car 100 are running independently, then the transmission controls of the FF car 90 are operative to control the transmission of the FF car 90 only, and similarly the transmission controls of the RR car 100 are operative to control the transmission of the RR car 100 only. On the other hand, when the FF car 90 and the RR car 100 are coupled together to form the combination car, then the trnsmission control system is put into its operational mode wherein the transmission controls of the FF car 90 are operative to control both the transmission of the FF car 90 and also the transmission of the RR car 100, while the transmission controls of the RR car 100 are disabled, so that they are not operative to control anything. Thus, both of the transmissions of the combination car may be controlled by a person sitting in the seat 16 of the FF car 90, i.e. in the front seat 16 of the combination car. On the other hand, a person sitting in the rear seat 116 of the combination car, i.e. in the seat 116 of the RR car 100, will not be able to exert any control function on either of the transmissions of the combination car.

Figure 16:
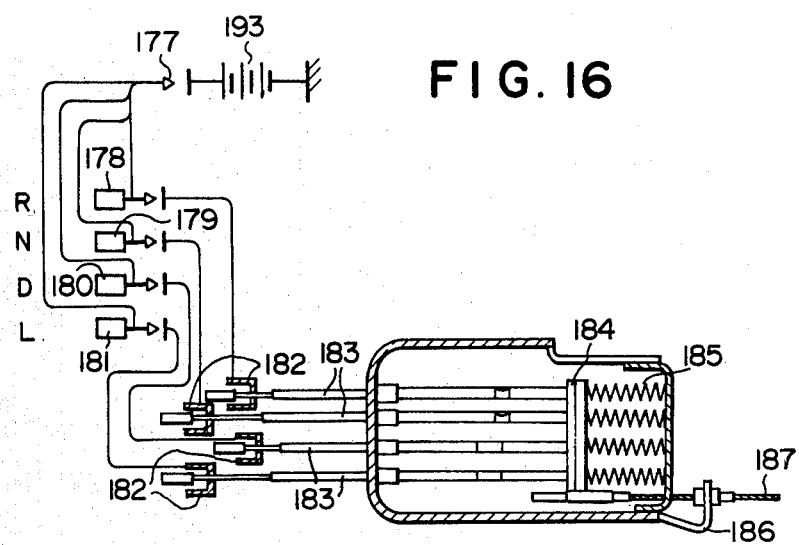
FIG. 16 is a part schematic part cross sectional diagram, showing a possible construction for a range selection mechanism in such an RR car which is to be incorporated in a combination car according to the above described construction, for selecting an operational gear speed range on an automatic gearbox incorporated in the transmission system of this RR car.
Figure 17:
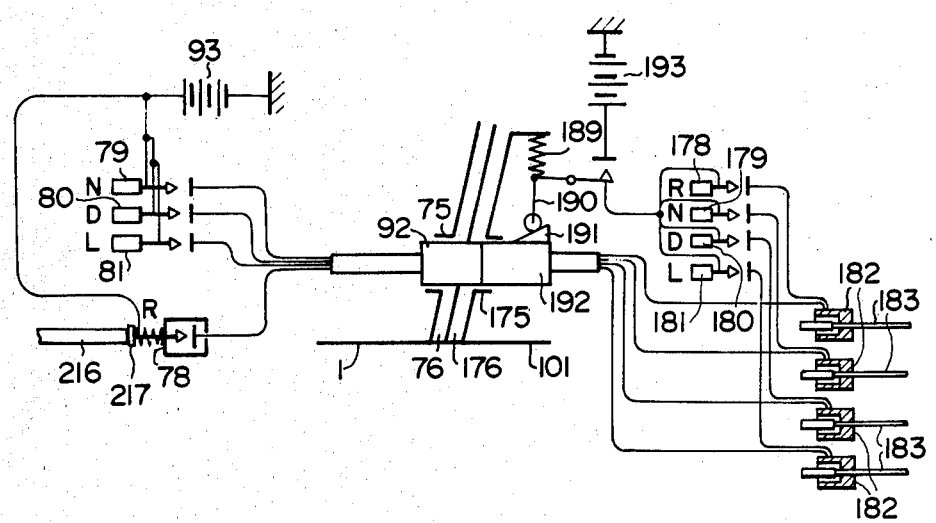
FIG. 17 is a schematic view, showing a possible construction for a mechanism for operating the range selection mechanism shown in FIG. 16 from an FF car which is coupled with said RR car to form a combination car according to the above described construction, and also showing part of the range selection mechanism shown in FIG. 16.

In more detail, a basic first construction of this transmission control system is shown in FIGS. 16 and 17, and a useful alternative construction for a part thereof is shown in FIGS. 18–24. As stated previously, it is desirable for the smooth operation of the combination car comprising the FF car 90 and the RR car 100 fixed together that the transmission of the RR car 100 should be an automatic transmission. Therefore, the exemplary construction for the transmission control system for the combination car system, which will hereinafter be explained, is particularly adapted for use with an automatic transmission in the RR car 100.

FIG. 16 shows those parts of the first exemplary construction for the transmission control system, which are incorporated in the RR car 100. The reference numerals 178, 179, 180, and 181 denote push button electrical switches which respectively are used for engaging reverse or (R) range, neutral or (N) range, drive or (D) range, or low or (L) range of the automatic transmission of the RR car 100.

The set of push button switches 178, 179, 180, and 181 is so constructed, although no mechanism relating thereto is shown in the drawings because such a mechanism is per se well known and conventional, that when any one of these push button switches 178, 179, 180, and 181 is pressed inwards so as to close its corresponding pair of contacts, said switch clicks into the depressed position and remains therein, and simultaneously releases any other one of the push button switches 178, 179, 180, and 181 which previously had been depressed and had similarly clicked into the depressed and closed condition. This kind of mechanism is used frequently in motor vehicles, with particular application to push button switches of radios and tape recorders. According to such a construction, any one of the switches 178, 179, 180, and 181 which is depressed is closed, and it is positively ensured that not more than one of these switches can be depressed and closed at the same time. In other words, release of these switches is performed by a so called "one only down" mechanism.

When the RR car 100 is being operated independently, a main transmission control switch 177 is closed, as will be seen hereinafter, and thereby electrical power from an electrical power source 193 such as the battery of the RR car 100 is conducted via a plurality of wires to one of the pair of contacts of each of the push button switches 178, 179, 180, and 181. From the other contact of each of these pairs of contacts of the push button switches 178, 179, 180, and 181, wires lead to one of four solenoids 182, the other electrical input wires of which are connected to earth and therefore are not shown. Each of these solenoids 182 is arranged, when supplied with activating electrical energy, to attract a corresponding actuator rod 183 in the rightwards direction in FIG. 16, and, whichever one of these rods 183 is thus driven rightwards, a cable actuator 184, supported within a housing and biased leftwards therein by a plurality of compression coil springs 185, is driven rightwards; it is so arranged, by a suitable construction of the solenoids 182, the actuator rods 183, etc., that, according to which one of the four solenoids 182 is energized, the cable actuator 184 is driven to the right by a different predetermined distance. The cable actuator 184 is connected to a cable 187 which is supported by a cable bracket 186, and the other end of this cable 187 is connected to a range setting valve incorporated in a hydraulic fluid pressure control system of the automatic transmission of the RR car 100, said range setting valve being of a per se well known type, and therefore not being shown in the drawings because it is conventional. In response to positioning of this range setting valve, the automatic transmission of the RR car 100 is set to either reverse or (R) range, neutral or (N) range, drive or (D) range, or low or (L) range, according to the amount of movement of the cable 187, i.e. of the cable actuator 184. Accordingly, when any one of the push button switches 178, 179, 180, and 181, corresponding respectively to the reverse or (R) range, neutral or (N) range, drive or (D) range, and low or (L) range settings, is depressed, then the corresponding solenoid 182 drives its corresponding actuator rod 183 rightwards in the drawing by just the correct amount to move the cable actuator 184 and the cable 187 to the right, and thereby to displace the aforementioned range setting valve of the automatic transmission of the RR car 100 to just the correct position to select that desired range of said automatic transmission.

The construction incorporating the actuator rods 183, the cable actuator 184, the compression coil springs 185, the cable support bracket 186, and the cable 187 is a per se well known type. It has been used for controlling the 1970 type Chrysler Torqueflite automatic transmission, and also for controlling the Powerflite automatic transmission. However, in these transmission control systems the rods 183 are not displaced by solenoids, but are displaced directly by direct pressure from manually operated push buttons. These automatic transmission control systems are described in the 1971 publication 37 Motor's Automatic Transmission Manual", 4th. edition, published by Motor Inc., New York, N.Y., U.S.A., pages 419 to 420 (Powerflite), and pages 440 to 442 (Torqueflite).

Thus, the mechanism comprising the solenoids 182, the actuator rods 183, the cable actuator 184, the compression coil springs 185, the cable support bracket 186, and the cable 187 constitutes an electrically operated servo device for positioning the range setting valve of the automatic transmission of the RR car 100 to any one of the reverse or (R) range, the neutral or (N) range, the drive or (D) range, and the low or (L) range. And, further, the electrical switching system incorporating the push button switches 178, 179, 180, and 181 constitutes an electrical switching system which can control said electrically operated servo device.

In FIG. 17, as well as the parts of the transmission control system shown in FIG. 16, which were fitted in the RR car 100, there are further shown the parts of the transmission control system for the combination car system which are fitted in the FF car 90, and also there is shown a selection system which selectively provides control of the above described electrically operated servo device, either from the above described electrical switching system, or from an electrical switching system provided in the FF car 90. In more detail, in FIG. 17 the condition is shown wherein the body 1 of the FF car 90 and the body 101 of the RR car 100 have been approached closely together and have been clamped together by using a clamping system such as the bolts 168 described previously, so that these bodies 1 and 101 are tightly coupled together to form the body of the combination car, in their positions with the rear end face panel of the body 1 of the FF car 90 clamped against the front end face panel of the body 101 of the RR car 100, with the weather strip 76 of the FF car 90 and the weather strip 176 of the RR car 100 clamped against the RR car 100 and against the FF car 90 respectively, so as to provide a good seal therebetween for preventing the ingress of dust, dirt, rain, snow or the like, and with the hole 75 formed in the lower edge of the rear end face panel of the body 1 of the FF car 90 directly opposing the hole 175 formed in the lower edge of the front end face panel of the body 101 of the RR car 100. In this condition, a connector 92 is provided in the FF car 90 as projecting somewhat from the hole 75, and correspondingly an electrical connector 192 is provided in the RR car 100 as opposing the hole 175 within the RR car 100, and this connector 92 is slidable leftwards and rightwards in FIG. 17 with respect to the body 101 of the RR car 100 through a certain distance. When the FF car 90 and the RR car 100 are to be coupled, after consummating the initial physical coupling of their bodies as described above, then the electrical connector 192 is moved leftwards in FIG. 17 so that it is abutted against the electrical connector 92 and connects respective electrical connections provided therein (not shown), and at this time a cam 191 which is formed on the upper side in the figure of the electrical connector 192 raises a roller 90 against the spring force of a compression coil spring 189, and by tilting a rocker arm opens the transmission control system main switch 177 previously described. In this condition, therefore, no electrical energy is supplied from the power source 193 of the RR car 100 to the push button switches 178, 179, 180, and 181 thereof, and accordingly the controlling function of these push button switches 178, 179, 180, and 181 for their respective solenoids 182 is disenabled. On the other hand, when it is desired to detach the body 1 of the FF car 90 and the body 101 of the RR car 100 from one another, and to operate the FF car 90 and the RR car 100 independently as separate road vehicles, then as soon as the electrical circuit connector 192 is displaced rightwards from its position shown in FIG. 17 then automatically the roller 190 will be allowed to move downwards in the figure, under the baising action of the compression coil spring 189, and thereby the transmission control main switch 177 in the RR car 100 will be closed, and the controlling action of the push button switches 178, 179, 180, and 181 for their respective solenoids 182 will be restored, and will operate as previously described.

To the electrical connector 192 there are led four electrical wires from, respectively, the four solenoids 182; each of these electrical wires is connected to that side of the solenoid 182 which is also connected to one of the contacts in its corresponding push button switch 178, 179, 180, and 181. These four wires within the electrical connector 192 are connected, when the electrical connector 192 is abutted to the electrical connector 92, to four corresponding wires which lead from the electrical connector 92. These four wires within the FF car 90 lead to the contacts of four electrical switches within the FF car 90, designated by reference numerals 78, 79, 80, and 81. The three switches 79, 80, and 81, in this construction, are push button switches, but the switch 78 is not a push button switch. All of these switches 79, 80, and 81 are incorporated in a one only down push button mechanism of the same type as previously described with reference to the push button switches 178, 179, 180, and 181 in the RR car 100; that is to say, when one of these switches 79, 80, and 81 is depressed, then it clicks down and locks into the depressed position, and at the same time releases any other one of these push button switches 79, 80, and 81 which was previously in the depressed position, and allows said other push button switch to return to its original position. However, the switch 78, only, has an action, when depressed—or actually when a reverse gear shift rod 216 is shifted rightward in FIG. 17 according to the shifting of a hand shift lever of the manual transmission of the FF car 90 to a position to engage reverse gear, as described in detail hereinunder—of releasing any of the other switches 79, 80, and 81 which was previously depressed, and this switch 78 returns to the open condition when the reverse gear shift rod 216 is returned leftward in FIG. 17. Thereby, it is positively ensured that only one at the most of the push button switches 78, 79, 80, and 81 can be closed at any one time.

The switches 78, 79, 80 and 81 correspond respectively to the solenoids which correspond to the push button switches 178, 179, 180, and 181. In other words if the switch 7 is depressed, it releases any of the push button switches 79, 80, and 81 which is depressed, and further said switch 78 sends power from the power supply 93 of the FF car 90 to the solenoid 182 which corresponds to the push button switch 178 in the RR car 100, and thus the automatic transmission of the RR car 100 is set to the resverse or (R) range; if the switch 79 is depressed, it releases any of the other push button switches 80 and 81 which is depressed, and further said switch 79 sends power from the power supply of the FF car 90 to the solenoid 182 which corresponds to the push button switch 179 in the RR car 100, and thus the automatic transmission of the RR car 100 is set to the neutral or (N) range; if the switch 80 is depressed, it releases any of the other push button switches 79 and 81 which is depressed, and further said switch 80 sends power from the power supply 93 of the FF car 90 to the solenoid 182 which corresponds to the push button switch 180 in the RR car 100, and thus the automatic transmission of the RR car 100 is set to the drive or (D) range; and, if the switch 81 is depressed, it releases any of the other push button switches 79 and 80 which is depressed, and further said switch 81 sends power from the power supply 93 of the FF car 90 to the solenoid 182 which corresponds to the push button switch 181 in the RR car 100, and thus the automatic transmission of the RR car 100 is set to the low or (L) range. It should be noted that the earth sides of the power supplies 93 and 193 are connected together, when the FF car 90 and the RR car 100 are being operated as linked together and combined into the combination car, via the bolts 168 which fix together the body 1 of the FF car 90 and the body 101 of the RR car 100.

According to a particular feature of the shown construction, the switch 78 in the FF car 90 which controls the engagement of reverse or (R) range from the transmission of the RR car 100, when the FF car 90 and the RR car 100 are being operated together as coupled together into the combination car, is not arranged to be depressed by hand, but is arranged to be pressed by the reverse gear shift rod 216, which moves to the right in FIG. 17 when the transmission of the FF car 90, which is a manual transmission, is put into reverse gear. Thus, the synchronization of the operation of putting the transmission of the FF car 90 into reverse gear and the operation of putting the transmission of the RR car 100 into reverse or (R) range is performed automatically, without need for thought on the part of the driver of the combination car. This is performed because it is very important indeed that, when the FF car 90 and the RR car 100 are coupled together and are being operated as the combination car, the transmission of the FF car 90 should never be in any forward gear while the transmission of the RR car 100 is in reverse or (R) range, or vice versa; if this is mistakenly done, then the engine of the FF car 90 and the engine of the RR car 100 will be at loggerheads, and the resulting propulsion situation will be totally unacceptable.

According to the above mentioned provision of the switch 78 and the push button switches 79, 80, and 81 in the FF car 90 as incorporated in a push button mechanism which allows only one of the switches 79, 80, and 81 at most to be depressed at one time, and which releases any other depressed one of these switches when said one switch is depressed, and which further releases any one of said switches, 79, 80, and 81 which is depressed when the switch 78 is closed, the simplest construction for the position of the push button switches 79, 80, and 81, in the FF car 90, will be near the base of the manual gear lever of the FF car 90. If this position is not considered to be the desired mounting position for the push button switches 79, 80, and 81, from the point of view of operability thereof, then the release linking of the switch 78 to the push button switches 79, 80, and 81 may be performed in some more complicated way, such as by link bars and the like, or via electrical servo mechanisms; these arrangements are not shown, because, based upon the above disclosure, they will be readily conceived of by one of ordinary skill in the switching art.

It should be noted that the head portion 217 of the contact switch 78 in the FF car 90 which is used for providing an electrical signal for engaging reverse or (R) range in the transmission of the RR car 100 should be formed of an insulating material, so as not to be earthed when the reverse gear shift rod 216, which presumably will be constructed of a metallic material, presses against it.

In the above described range setting device for the automatic transmission of the RR car 100, shown in FIGS. 16 and 17, no parking or (P) range is provided. This is because, if such a parking or (P) range is provided and the transmission is put into such a parking or (P) range when the RR car 100, or the combination car composed of the joined FF car 90 and RR car 100, is stationary, then, if some electrical fault should occur and cause a loss of electrical power, it would be impossible to get the automatic transmission of the RR car 100 out of said parking or (P) range, and accordingly the RR car 100 would be immovable. This would be a very troublesome and annoying circumstance, and accordingly it is not considered that it is desirable to have a parking or (P) range which is electrically engaged. In a conventional automatic gearbox, the device which implements the operation of the parking or (P) range is generally a mechanical device such as a pawl which mechanically locks the output shaft of the automatic transmission, and accordingly in the RR car 100, in place of this, if a conventional parking brake is provided, effectively the same action will be obtained, without the risk of it being impossible to get the transmission of the RR car 100 out of the parking or (P) range, in the event of some electrical failure.

Because the three push button switches 79, 80, and 81, which serve for engaging, respectively, the neutral or (N) range, the drive or (D) range, and the low or (L) range of the automatic transmission of the RR car 100, are incorporated in a one only down push button release mechanism as described above, thus it is positively prevented that any two of these three switches 79, 80, and 81 should be depressed at the same time, and accordingly in this first shown construction there is no danger that there will be any attempt to engage, for example, the drive or (D) range along with the low or (L) range, or the low or (L) range along with the neutral or (N) range, or the neutral or (N) range along with the drive or (D) range. Further, although the switch 78 which controls the engagement of the reverse or (R) range of the automatic transmission of the RR car 100 is not incorporated into this one only down push button mechanism, since in this construction the switch 78 is not a push button switch, but as explained above is automatically actuated by pressure from the reverse gear shift rod 216 in view of the importance of ensuring that this switch 78 should always be depressed whenever the transmission of the FF car 90 is shifted into the reverse gear, as explained above when this switch 78 is closed by being depressed by the reverse gear shift rod 216 it has a function of releasing any of the push button switches 79, 80, and 81 which is at that time depressed. In this connection, it might be anticipated that more than one of the four switches 78, 79, 80, and 81, should be simultaneously closed, during operation of the FF car 90 and the RR car 100 as coupled together into the combination car. Such a possibility might be the circumstance that when first the manual transmission of the FF car 90 is shifted into reverse gear by the driver of the combination car, thus depressing the switch 78 by the action of the reverse gear shift rod 216 and accordingly releasing any one of the three push button switches 79, 80, and 81 which has been depressed and accordingly shifting the automatic transmission of the RR car 100 into the reverse or (R) range, and then subsequently the driver of the combination car, through ignorance or the like, without shifting the manual transmission of the FF car 90 out of reverse gear, pushes one of the push button switches 79, 80, and 81, mistakenly in order to try to utilize the neutral or (N) range, the drive or (D) range, or the low or (L) range of the automatic transmission of the RR car 100. It is very important, especially with regard to the operation of the drive or (D) range actuated by the push button switch 80, or the low or (L) range actuated by the push button switch 81, that this action of depressing one of the push button switches 79, 80, and 81 should not have any effect of shifting the automatic transmission of the RR car 100 out of the reverse or (R) range.

However, such a possibility is positively obviated if the above described link mechanism is so constructed that it locks all of the push button switches 79, 80, and 81 from being depressed by the hand of the driver, when the reverse gear shift rod 216 is shifted rightward in FIG. 17 so as to close the switch 78. Such a link mechanism, though not shown in the drawing, will be readily designed by one of ordinary skill in the art of multi button switches.

Further, there is anticipated to occur another circumstance in which, in the shown first construction, none of the four switches 78, 79, 80, and 81 are in the closed condition, when, after having first shifted the manual transmission of the FF car 90 into reverse gear, at which time the reverse gear shift rod 216 of course is pressed, as already described, against the switch 78 so as to close it and so as to supply actuating electrical energy to that one of the solenoids 182 which provides the reverse or (R) range for the automatic transmission of the RR car 100, and simultaneously, according to the above described release action provided by the switch 78 for the three push button switches 79, 80, and 81, any one of these push button switches which formerly was depressed was released, and then subsequently the driver of the FF car 90 shifts the manual transmission thereof out of reverse gear, so that the reverse gear shift rod 216 ceases to press upon the switch 78 and accordingly allows this switch 78 to become opened, but at this time the driver of the FF car 90 does not depress any one of the push button switches 79, 80, and 81 which correspond respectively to the neutral or (N) range, the drive or (D) range, and the low or (L) range of the automatic transmission of the RR car 100. In this condition none of the solenoids 182 will be supplied with actuating electrical energy. This circumstance is quite likely to occur, because it is inevitable that the driver of the FF car 90 will not depress the one of the switches 79, 80, and 81 corresponding to the range of the automatic transmission of the RR car 100 which he desires to engage, exactly simultaneously with shifting of the transmission of the FF car 90 out of reverse gear, and indeed at this time it is possible, through injudicious operation, that the combination car composed of the FF car 90 and the RR car 100 as coupled together may still actually be moving in the reverse direction. If at this time the low or (L) range or the drive or (D) range of the automatic transmission of the RR car 100 is engaged, there is the problem that a very substantial jerk may occur, possibly leading to a disastrous accident.

Therefore, it is desirable that, if none of the solenoids 182 is supplied with actuating electrical energy, and accordingly the cable actuator 184 is not displaced at all to the right in FIG. 16 from its rest position to which it is biased by the compression coil springs 185, in other words, its position in which the cable 187 is tightest, that the position of the range setting valve of the automatic transmission of the RR car 100 corresponding to this position of the cable actuator 184 should be a position which provides the neutral or (N) range from the automatic transmission of the RR car 100. Therefore, although the structures shown in FIGS. 16 and 17 include the solenoid 182 to be controlled by the push button switch 79 or 179, to show all possible control systems, this solenoid may be omitted. This ensures that the worst that can happen, if the driver of the FF car 90 neglects to depress any one of the push button switches 79, 80, and 81, after having shifted the transmission of the FF car 90 out of reverse gear, is that the automatic transmission of the RR car 100 remains in the neutral or (N) range, and accordingly provides no transmission of driving power from the engine of the RR car 100 to the rear wheels 104 of the combination car composed of the FF car 90 and the RR car 100 as coupled together.

No doubt the driver of the combination car will soon notice that this condition is occurring, by the fact that, because at this time, since the combination car is being driven forwards by the use only of the engine of the FF car 90 which is driving the front wheels 3 of the combination car, but as explained above the engine control system is at this time providing throttle opening for the engine of the RR car 100 substantially corresponding to the throttle opening of the engine of the FF car 90, which at this time of course is an abnormally great throttle opening since the engine of the FF car 90 is laboring because it and it only is propelling along the road the considerably heavy body of the combination car composed of the body 1 of the FF car 90 and also the body 101 of the RR car 100, thus the engine of the RR car 100 will quickly come to be rotating at a high revolution speed and will then make a considerable amount of noise.

As an alternative construction with regard to the arrangement of the switches for controlling the automatic transmission of the rear RR car 100 from the front FF car 90 in the combination car, the switch 81 which engages the low or (L) range of the automatic transmission may be incorporated in the grip portion of the gear shift lever of the FF car 90. When the switch 81 is mounted in the dash panel as explained above, if the driver wants to obtain high engine braking effect by shifting down the transmission of the FF car 90 from, for example, the third gear to the second or the first gear, and also by shifting down the automatic transmission of the RR car 100 from the drive or (D) range to the low or (L) range, he or she has to manipulate the shift lever and almost simultaneously has also to push the switch 81 at the dash panel. This compels the driver to perform a very difficult and troublesome operation. By contrast, if the switch 81 for engaging the automatic transmission of the RR car 100 is mounted at the grip portion of the shift lever of the FF car 90, then the driver will be easily able to put this switch 81 on at the same time when he or she manipulates quickly the shift lever so as to shift the transmission of the FF car 90 down to a lower gear in order to effect strong engine braking. In this case, the interrelation between the operations of the switches 78, 79, 80, and 81 may be provided by incorporating some electromagnetic devices, which are not shown in the drawings but are per se well known.

Referring now to FIGS. 18-24, the construction of the switch 81 for engaging the low or (L) range from the automatic transmission of the RR car 100, which is mounted within the gear knob of the gear shift lever of the manual transmission of the FF car 90, will be explained. The reference numeral 350 denotes the gear shift lever for the manual transmission of the FF car 90, which in the shown construction is a floor shift type manual transmission, and the reference numeral 345 denotes a gear shift knob mounted on this gear shift lever 350. A recessed portion 348 is formed on the side of this gear shift lever knob 345, and within this recessed portion 348 there is mounted a low or (L) range switch 81, which corresponds to the push button switch 81 shown in the first proposed construction shown in FIG. 17.

In order to prevent the low or (L) range switch 81 from being operated inadvertently, a sliding cover 346 is provided for covering the opening of this recessed portion 348, as will be explained in detail hereinafter. On the outside of the cover 346 a small projection 346a is provided for convenient engagement with the thumb or the finger of the driver of the combination car, who may, when desiring to shift down quickly in order to obtain engine braking from the combination car, engage this projection 346a with a finger or thumb and slip back the cover 346 so as to easily and quickly get at the low or (L) range switch 81, while shifting the manual transmission of the FF car 90 down into a low gear at substantially the same time.

In more detail, as may be best seen in FIG. 21, which is a cross section perpendicular to the axis of the gear shift lever knob 345, taken along a plane perpendicular to the arrows G in FIG. 19, and in FIG. 22, which is a section along a plane perpendicular to the arrows H in FIG. 21, the cover 346 is constructed as a trough shaped member which is engaged into grooves 347 provided as recesses in the radially extending surfaces which join circumferentially extending radially larger and smaller surfaces of the gear shift knob 345, so that the cover 346 may slide in the axial direction of the gear shift knob 345, but may not move in the radial direction outwards therefrom. The cover 346 is biased in the upwards direction in FIGS. 18, 19, and 22 by two compression coil springs 365, which are located in the lowermost parts in FIGS. 18 and 22 of the grooves 347, in somewhat enlarged receiving portions thereof, so that these springs 365 cannot come out from these receiving portions. Accordingly, therefore, the cover 346 may be closed by a relatively small force applied thereto in the upwards direction in FIGS. 18 and 22 by the finger or thumb of the driver of the combination car, so as to cover the switch 81; but, in order for the cover 346 to be opened, so as to uncover the switch 81, a relatively high force is required to be exerted thereon by the finger or the thumb of the driver in the downwards direction in FIGS. 18 and 22. By this means, inadvertent operation of the low or (L) range switch 81 is positively prevented.

The cover 346 is arranged to be positively maintained at either of its extreme positions within its travel within the grooves 347 by means of a catch mechanism which will now be described. On the inside side of the cover 346 there is provided a recessed hole 358, and in positions corresponding to this, within the body of the gear shift knob 345, as may be seen in a general axial sectional view in FIG. 19, there are provided an upper and a lower radially extending hole, in which there are respectively received compression coil springs 355 and 357, which respectively bias pin members 356 and 366 in the rightwards and upwards direction in FIG. 19. As shown in detail in FIG. 23, which is an axial longitudinal cross section of the hole containing the spring 355 and the pin member 356, each of these pin members 356 and 366 is formed with a point at its outside end, and is prevented from coming out of its hole by a cover member 367 with a central hole therein which is large enough to pass said point, but is not large enough to pass the body of said pin, towards which said pin 356 or 366 is urged by its compression coil spring 355 or 357. When the cover 346 is in its downwards position as shown in FIG. 19, then the depressed portion 358 therein engages with the point of said pin 366, and accordingly there is presented a substantial resistance to the cover 346 being moved upwards in FIG. 19 from this position, although this movement is not completely prevented; for, when a sufficient upwards pressing force is exerted on the cover 346, this will cause the pin 366 to be slid leftwards and downwards in FIG. 19 against the biasing action of the compression coil spring 357 which is overcome, and the cover 346 may be moved upwards. Similarly, when the cover 346 is in its uppermost position in FIG. 19, then the point of the pin 356 will engage into the depressed portion 358 formed in this cover 346, and will retain the cover 346 in place against a certain amount of pressing action downwards in FIG. 19 exerted thereon by the finger or thumb of the driver. However, when a suifficiently great force is exerted in the downwards direction in FIG. 19 upon this cover 346, then the compression action of the compression coil spring 355 which is biasing the pin 356 in the rightwards and upwards direction in FIG. 19 will be overcome, and the pin 356 will be moved downwards within its hole, and its point will move out of the depressed hole 358 formed in the cover 346, thus allowing the cover 346 to be moved in the downwards direction in FIG. 19. Accordingly, by this construction, a suitable catch mechanism is provided for the cover 346 at both ends of its travel within the grooves 347.

Within the recessed portion 348 in the gear shift knob 345, there is provided the switch 81 for the low or (L) range of the automatic transmission of the RR car 100. This switch 81 comprises a switch member 349, best seen in FIGS. 19 and 20, which is formed with an outer portion adapted for being flicked by the thumb or finger of the driver of the combination car, and with a central portion 364, both of which are covered with an insulating material. Through the central portion 364 passes a support pin 360, which is rotatably mounted in a pin support 363 which is fixed to the body of the gear shift knob 345. Accordingly, by being pushed by the finger or thumb of the driver, the switch member 349 may be rotated about the axis of this pin 360, i.e. about an axis perpendicular to the plane of the drawing paper in FIG. 19. To the left of the axis of the pin 360 in FIGS. 19 and 20 the switch member 349 is provided with a metallic rod 359 protruding therefrom, at the end of which is formed a metallic spherical ball shaped portion 361. From the side of the rod portion 359 there protrudes a first spring support member 368a, and from the side of the recess 348 in the gear shift knob 345, somewhat radially outwardly of the axis of the pin 360, there protrudes a second spring support member 368b. Between the first spring support member 368a and the second spring support member 368b there is stretched a tension coil spring 362, which accordingly provides a snap action for the switch member 349 between an extreme position in the counterclockwise direction as seen in FIG. 19, wherein the spherical ball shaped portion 361 thereon engages with a first catch 354 provided near the bottom of the recess 348 formed in the gear shift knob 345, and an extreme position in the clockwise direction in FIG. 19, in which the ball shaped portion 361 formed on the switch member 349 engages with a second catch 353, also provided near the bottom of the recess 348 formed in the gear shift knob 345. Two lead wires lead to this low or (L) range switch: a lead wire 351 and a lead wire 369. In the construction shown in FIGS. 18 and 19, these lead wires 351 and 369 are housed in a groove 352 formed in the shift lever 350, and in the upwards direction therefrom in the figures these lead wires 351 and 369 pass through a hole in the gear shift knob 345, as may be seen in cross section in FIG. 21, upwards to within the recessed portion 348 therein, and the end of the lead wire 351 is connected to the rod portion 359 of the switch member 349, while the end of the other lead wire 369 is connected to the catch 354 which receives the spherical ball shaped portion 361 when the switch member 349 is displaced by the aforesaid snap action of the tension coil spring 362 to its maximum counterclockwise position as seen in FIG. 19, as explained above. The lower parts in FIG. 18 of the lead wires 351 and 369 are led through a hole 370 formed in a flare portion 371 of the lower part of the shift lever 350, and are then led out under the floor 118 of the body 1 of the FF car 90.

As an alternative construction, shown in FIG. 24, if for example the shift lever 450 of the FF car 90 is a column shift lever, then this shift lever 450 can be made as a hollow lever, and in this case the lead wires 351 and 369 can be led through a central hollow formed in the gear shift knob, designated in this figure by the reference numeral 445, and can be led through the central hollow portion of the gear shift lever 450 and, after of course passing through the inner space in a steering column outer tube not shown in the figures, can be led to the aforesaid electrical connector 192.

According to this construction, if the driver of the combination car is driving the combination car with the push button switch 80 corresponding to the drive or (D) range of the automatic transmission of the RR car 100 in the depressed or ON condition, and with the switch member 349 in its clockwise biased position as shown in FIG. 19, i.e. with the spherical ball shaped portion 361 engaged with the catch 353, so that the low or (L) range switch 81 is in the OFF condition, then no electrical connection is provided between the lead wire 351 and the lead wire 369, and accordingly the solenoid 182 corresponding to the low or (L) range for the automatic transmission of the RR car 100 is not supplied with actuating electrical energy, and the automatic transmission of the RR car 100 is set to the drive or (D) range. Typically, at this time, the cover 346 will be in the upward position as seen in FIGS. 18 and 19, wherein it covers the end portion of the switch member 349, and is engaged with the catch comprising the pin member 356.

If now it is desired by the driver of the combination car to obtain quick deceleration utilizing engine braking, then he or she places his or her hand on the gear shift lever knob 345 and, via the gear shift lever 350, shifts the manual transmission of the FF car 90 down into a low gear such as first or second gear, and substantially simultaneously with the finger or thumb the driver sharply presses the cover 346 in the downward direction in FIGS. 18 and 19, so as to disengage this cover 346 from the point of the pin 356 by overcoming the compression force of the compression coil spring 355, and so as to move said cover 346 to its downward position as shown in FIG. 19, wherein said cover 346 engages with the point of the pin 366 and is thereby retained in this position. Immediately thereafter, the driver then flicks the upward and rightward part as seen in FIG. 19 of the switch member 349 in the upward and leftward direction, so that the switch member 349 rotates in the counterclockwise direction as seen in this figure and so that the spherical ball shaped portion 361 formed thereon disengages with the catch 353 and engages with the catch 354. In this condition, an electrical connection is provided between the wires 351 and 369, via the metallic rod portion 359 and the metallic spherical ball shaped portion 361 of the switch member 349, and thus, as explained above, the low or (L) range switch 81 is put into the ON condition, and supplies actuating electrical energy, via the electrical connectors 92 and 192, to that one of the solenoids 182 which engages the low or (L) range of the automatic transmission of the RR car 100. Accordingly, good engine braking is available from the engine of the RR car 100 via this automatic transmission, as well as from the engine of the FF car 90 via the manual transmission of the FF car 90. At this time, even if there is some difference between the gear ratio engaged in the manual transmission of the FF car 90 and the gear ratio engaged in the automatic transmission of the RR car 100, the torque converter of the automatic transmission of the RR car 100 will absorb any sudden torque shock that might otherwise be caused by this sudden difference in gear ratios, and accordingly no jolt or the like will be generated by the engagement of low or (L) range of the transmission of the RR car 100.

The above description of the transmission control system has been made under the assumption that the transmission of the RR car 100 is an automatic transmission. However, it is possible, within the scope of the present constructive concept, to use a manual transmission for the RR car 100, as well as using a manual transmission for the FF car 90. In this case, the construction required would be somewhat more complicated: the position of the gear shift lever of the FF car 90 might be measured by a position sensor switch, and the position of the clutch pedal of the FF car 90 might be measured by a potentiometer, and in the RR car 100 there might be provided servo motors and solenoid switched for actuating the clutch and the manual transmission thereof, based upon the measured values from the above mentioned potentiometer and position sensor switch. This would be well within the scope of the above described conception of the transmission control system. Details will be fairly clear to one of ordinary skill in the art, based upon the above disclosure.

Further, it is possible, within the scope of the present constructive concept, to use an automatic transmission for the FF car 90, as well as using an automatic transmission for the RR car 100. In this case, the construction required would be simple; it is merely necessary to provide a set of push button switches such as 79, 80, and 81, but also including a reverse or (R) range switch 78, in the FF car 90 for controlling the automatic transmission thereof, and to connect these push button switches, via the electrical connectors 92 and 192, to the electrically acutated servo device in the RR car 900 comprising the solenoids 182, the cable actuator 184, the cable 187, etc.. This would, again, be well within the scope of the above described conception of the transmission control system. Details, again, will be fairly clear to one of ordinary skill in the art, based upon the above disclosure.

THE BRAKE CONTROL SYSTEM

Figure 26:
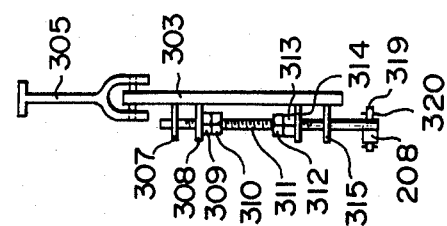
FIG. 26 is an enlarged side view of part of the brake pedal linkage system, for the RR car, shown in FIG. 25, looking along the direction shown by the arrow B in FIG. 25.
Figure 25:
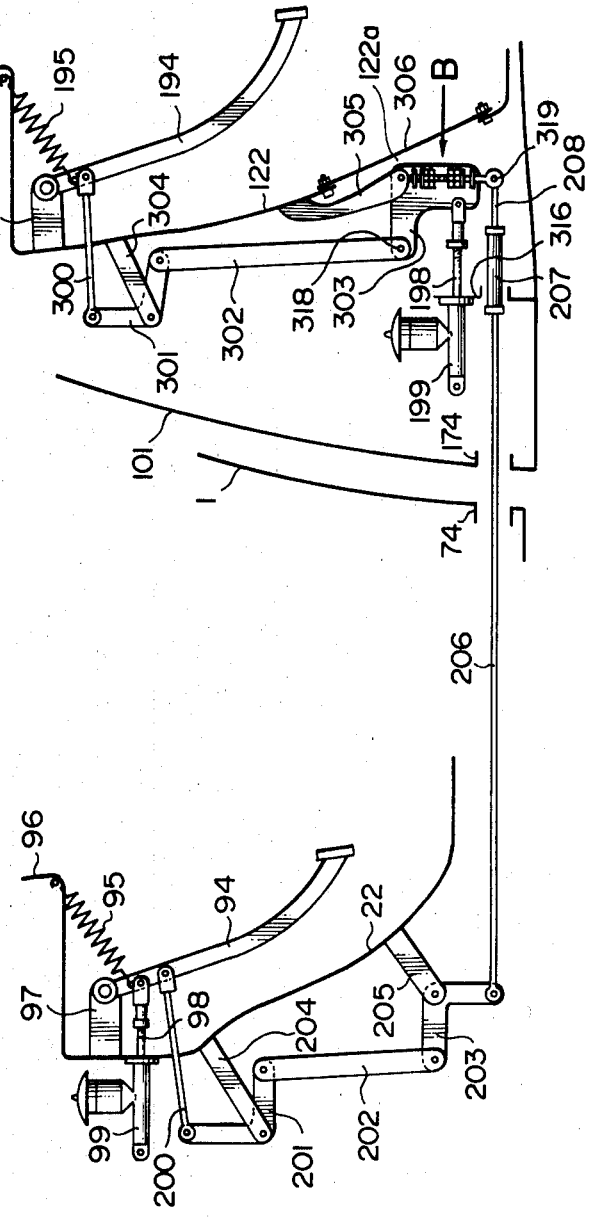
FIG. 25 is a partly schematic combined side view, showing a possible construction for a brake pedal linkage system in such an FF car, and a possible construction for a brake pedal linkage system in such an RR car, this FF car and this RR car being coupled together into a combination car according to the above described construction, and these pedal linkage systems being mechanically connected together at this time.

In FIGS. 25 and 26 there is shown one possible construction for a brake control system for the combination car system. According to the operation of this brake control system, when the FF car 90 and the RR car 100 are running independently, then the brake pedal 94 of the FF car 90 is operative to control the braking system of the FF car 90 only, and similarly the brake pedal 194 of the RR car 100 is operative to control the braking system of the RR car 100 only. On the other hand, when the FF car 90 and the RR car 100 are coupled together to form the combination car, then the brake control system is put into its operational mode wherein the brake pedal 94 of the FF car 90 is operative to control both the braking system of the FF car 90 and also the braking system of the RR car 100, while the brake pedal 194 of the RR car 100 is disabled, so that it is not operative to control anything. Thus, the braking system of the combination car may be controlled by a person sitting in the seat 16 of the FF car 90, i.e. in the front seat 16 of the combination car. On the other hand, a person sitting in the rear seat 116 of the combination car, i.e. in the seat 116 of the RR car 100, will not be able to exert any control function on either of the braking systems of the combination car. FIG. 25 shows an overall view of the mechanism in both the FF car 90 and in the RR car 100, and FIG. 26 shows a detail of this mechanism as seen from the direction of the arrow B in FIG. 25.

In more detail, in FIG. 25 at the central portion thereof the rear end face panel of the body 1 of the FF car 90 is partly shown, including its lower edge portion which is pierced with the hole 74, and also the front end face panel of the body 101 of the RR car 100 is partly shown, including its lower edge portion which is pierced with the hole 174; thus, in the condition shown in FIG. 25, the body 1 of the FF car 90 and the body 101 of the RR car 100 have already been coupled together, as explained in the above description of one exemplary constructional example of the combination car system, in order to form the body of the combination car.

In the FF car 90, the dash panel 22 thereof is provided with a bracket 97 mounted thereon projecting to the passenger compartment interior side thereof, and to this bracket 97 there is pivoted one end of a brake pedal 94 of the FF car 90. The brake pedal 94 is biased in the counterclockwise direction in FIG. 25 by a tension coil spring 95, which is connected between a part of said brake pedal 94 and a part of the instrument panel 96 of the FF car 90. One end of a push rod 98, the length of which is adjustable, is coupled to part of the brake pedal 94, and the other end of this push rod 98 extends to and operates a brake master cylinder device 99 which is fixed to the outside side of the dash panel 22 of the FF car 90, outside the passenger compartment thereof. From this master cylinder device 99, hydraulic conduits extend to both of the front wheels 3 of the FF car 90, and to both of the back wheels 4 of the FF car 90, and hydraulic pressure selectively supplied therethrough by the master cylinder 99 selectively actuates wheel braking elements of these wheels in order to brake the rotation thereof. These arrangements are not shown in the drawings because they are per se well known and conventional.

One end of a first link rod 200 is connected to a position on the brake pedal 94 of the FF car 90 somewhat further removed from the rotational axis thereof, where said brake pedal 94 is pivoted to the bracket 97, than is the position at which the push rod 98 is connected thereto; the reason for this will be explained later. The other end of the first link rod 200 is connected to one arm of a first bell crank 201, which is pivoted on a bracket 204 which is attached to the outside side of the dash panel 22, outside the passenger compartment of the FF car 90. The other arm of this first bell crank 201 is connected to one end of a first link bar 202, the other end of which is connected to one arm of a second bell crank 203, which is pivoted upon another bracket 205 which also extends outwards from the dash panel 22 of the FF car 90, on the outside side thereof to the passenger compartment of the FF car 90. In fact, the end of this bracket 205 to which is pivoted the second bell crank 203 is substantially at the level of the floor 18 of the FF car 90, in the shown construction. Thus, the other arm of the second bell crank 203, which extends downwards from its pivotal point, terminates at a point somewhat below the bottom level of the floor 18 of the FF car 90. To this arm of the second bell crank 203 there is attached one end of a long stiff link rod 206. This link rod 206 extends backwards under the floor 18 of the FF car 90 and passes through the hole 74 formed in the lower edge of the rear end face panel of the body 1 of the FF car 90. A turnbuckle 207 is mounted on the end remote from the second bell crank 203 of this link rod 206, and to the other side of this turnbuckle 207 there is mounted a short rod 208 formed with a mounting hole at its end remote from said turnbuckle 207. Thus, when the FF car 90 is being operated independently, the end of this link rod 206 with the turnbuckle 207 and the short rod 208 mounted thereon extends somewhat out from the hole 74 at the bottom edge of the rear end face panel of the body 1 of the FF car 90, to the outside; this will not cause any problems in practice. In this condition, therefore, by application of the brake pedal 94, the arm of said brake pedal 94, the link rod 98, the brake master cylinder 99, the hydraulic conduits (not shown) which extend therefrom to conduct hydraulic fluid pressure, etc., constitute a first displacement transmission mechanism which transmits displacement of the first brake pedal 94 in the FF car 90 to the wheel braking elements thereof.

Similarly, in the RR car 100, the dash panel 122 thereof is provided with a bracket 197 mounted thereon projecting to the passenger compartment interior side thereof, and to this bracket 197 there is pivoted one end of a brake pedal 194 of the RR car 100. The brake pedal 94 is biased in the counterclockwise direction in FIG. 25 by a tension coil spring 195, which is connected between a part of said brake pedal 194 and a part of the instrument panel 196 of the RR car 100. One end of a second link rod 300 is connected to a position on the brake pedal 194 of the RR car 100, and the other end of this second link rod 300 is connected to one arm of a third bell crank 301, which is pivoted on a bracket 304 which is attached to the outside side of the dash panel 122, outside the passenger compartment of the RR car 100. The other arm of this third bell crank 301 is connected to one end of a second link bar 302, the other end of which is connected, via a link pin 318, to one arm of a fourth bell crank 303, which is pivoted on another bracket 305 which also extends outwards from the dash panel 122 of the RR car 100, on the outside side thereof to the passenger compartment of the RR car 100.

To a part of the lower arm of the fourth bell crank 303 there is pivotally attached a push rod 198, the length of which is adjustable, and the other end of this push rod 198 extends to an operates a brake master cylinder device 199 which is fixed to a support panel 316 which is mounted on the floor 118 of the RR car 100. From this master cylinder device 199, hydraulic conduits extend to both of the front wheels 103 of the RR car 100, and to both of the back wheels 104 of the RR car 100, and hydraulic pressure selectively supplied therethrough by the master cylinder device 199 selectively actuates wheel braking elements of these wheels in order to brake the rotation thereof. These arrangements are not shown in the drawings because they are per se well known and conventional.

Further, on the fourth bell crank 303 there are provided four supports 307, 308, 314, and 315, in which is slidably mounted a rod 311, the lower end of which is formed with a hole for fixing, as will be explained later. In more detail, the rod 311 is movable upwards and downwards in FIGS. 25 and 26, and is slidably supported in holes formed in these four collinear supports 315, 314, 308, and 307, which are mounted in that order on the fourth bell crank 303, from the outward end of its downwardly extending arm inwards towards its rotational axis. In more detail, in fact, the middle portion of the rod 311 is formed as a threaded portion, and this portion passes through substantially circular holes formed in the two intermediate supports 314 and 308, while, on the other hand, the lower end portion of the rod 311 in FIGS. 25 and 26 is formed with a polygonal cross section such as a square or rectangular cross section, which engages with a corresponding polygonal shaped hole in the end support 315, so that the rod 311 is slidable with respect to this support 315, but is not rotatable with respect to it; and the upper end in FIGS. 25 and 26 of the rod 311 is also formed with a polygonal cross section such as a square or rectangular cross section which engages with a corresponding polygonal shaped hole in the end support 307, so that the rod 311 is slidable with respect to this support 307, but is not rotatable with respect to it.

In between the intermediate supports 314 and 308 there are mounted on the threaded portion of the rod 311 four nuts 313, 312, 310, and 309 in that order. The nut 312 is a lock nut for the nut 313, and the nut 310 is a lock nut for the nut 309. By rotating the nuts 313 and 309, therefore, by the bearing of these nuts against the supports 314 and 208 respectively the rod 311 may be adjusted in its axial position in the upwards and downwards directions in FIGS. 25 and 26, and may be fixed in this axial position by the clamping of the lock nut 312 against the nut 313, and by the clamping of the lock nut 310 against the nut 309. At this time, as explained above, the rod 311 is not able to rotate around its longitudinal axis, because the polygonal cross section of its lower end portion in FIGS. 25 and 26 engages with the corresponding polygonal hole formed in the support 315, and also because the polygonal cross section of the upper end in FIGS. 25 and 26 of this rod 311 engages with the corresponding polygonal cross section of the hole formed in the support 307. By this longitudinal adjustability of the rod 311 with respect to the fourth bell crank 303, thereby the relative position of the hole formed in the lower end of the rod 311 in FIGS. 25 and 26, with respect to the fixing point of the push rod 198 to the fourth bell crank 303, may be adjusted continuously. Thereby, the adjustment of the ratio of the amount of displacement of the braking elements of the RR car 100 to the amount of displacement of the first brake pedal 94 of the FF car 90, when the RR car 100 and the FF car 90 are being operated together as the combination car, may be performed, as will be seen from the following description. Thus it is possible properly to synchronize the operation of the braking system of the FF car 90 with the operation of the braking system of the RR car 100, during operation of the combination car. In this construction, this adjustment may be performed in a continuous fashion, which is very helpful for precise synchronization.

Thus, when the RR car 100 is operating independently, nothing is connected to the hole at the lower end in FIGS. 25 and 26 of the rod 311, and accordingly the mechanism comprising the second link rod 300, the second link bar 302, and the third bell crank 301 constitutes a first displacement transmission submechanism which transmits displacement of the second brake pedal 194 of the RR car 100 to the connection unit which comprises the fourth bell crank 303, and the mechanism comprising the push rod 198, the brake master cylinder 199, the hydraulic conduits (not shown) which extend therefrom in order to transmit actuating hydraulic fluid pressure to the wheel braking elements of the RR car 100, etc., constitutes a second displacement transmission submechanism which transmits displacement of said connecting unit comprising the fourth bell crank 303 to the wheel braking elements of the RR car 100.

Now, when the FF car 90 and the RR car 100 are to be operated together and thus are to be coupled together into the combination car, first the body 1 of the FF car 90 and the body 101 of the RR car 100 are approached together and are physically coupled together, as explained above with respect to the first exemplary constructional example of the combination car system, i.e. are brought to their relative positions as shown in FIG. 25. At this time, of course, since the FF car 90 and the RR car 100 have been previously running independently, the adjustment of the length of the rod 98 which is connected to the first brake pedal 94, and the adjustment of the length of the rod 198 which is connected to the fourth bell crank 303 and therefrom indirectly to the second brake pedal 194, have been so performed that the independent braking systems comprising, respectively, the brake master cylinder 99 and the brake master cylinder 199, in the FF car 90 and in the RR car 100, are properly adjusted for good and snappy braking action. Now, since the body 1 of the FF car 90 and the body 101 of the RR car 100 are closely approached together, the long link rod 206, the turnbuckle 207, and the short rod 208 are presently protruding through the hole 174 formed in the bottom edge of the front face end panel of the body 101 of the RR car 100, and through a hole in the support panel 316 which supports the brake master cylinder 199 of the RR car 100, so that the hole in the free end of the short rod 208 is closely approached to the hole in the lower end in FIGS. 25 and 26 of the bar 311. Now, the turnbuckle 207 is adjusted, and the axial position of the bar 311 is adjusted as described above, and the hole in the end of the rod 208 and the hole in the lower end of the bar 311 are brought into exact alignment. Then a link pin 319 is passed through both of these holes, and the ends of this link pin are secured by split pins 320. Next, the pin 318 which links the link bar 302 with the upper arm of the fourth bell crank 303 is removed, and thus the driving coupling between these members is eliminated. These operations may be conveniently carried out by removing a panel 306 which covers a hole 122a which is formed in the lower part of the dash panel 122 of the RR car 100. When these various adjustments have been finished, the panel 306 is replaced and secured with nuts, so as to provide a solid dash panel and floor for the RR car 100.

Thus, when the FF car 90 and the RR car 100 are thus coupled together, and their braking systems have been connected together as described above, the depression of the brake pedal 194 in the RR car 100 will have no effect on either of the braking systems of either of the vehicles; but, on the other hand, when the brake pedal 94 in the FF car 90 is depressed, not only will this displacement operate the braking system of the FF car 90, via the aforesaid first displacement transmission mechanism comprising the brake master cylinder 99 as described above, but also, via the first link rod 200, the first bell crank 201, the first link bar 202, the second bell crank 203, and the long link rod 206, and via the turnbuckle 207 and the short rod 208, this displacement will displace the fourth bell crank 303 in the clockwise direction in FIG. 25, so as to actuate the braking system of the RR car 100, via the push rod 198 and the brake master cylinder 199 thereof.

Accordingly, when the FF car 90 and the RR car 100 are being operated together as described above, the link mechanism comprising the first link rod 200, the first bell crank 201, the first link bar 202, the second bell crank 203, the long link rod 206, the turnbuckle 207, and the short rod 208 constitutes a third displacement transmission mechanism which extends from a part of the first displacement transmission mechanism to be removably drivingly coupled to said connection unit comprising the fourth bell crank 303, at which time said first displacement transmission submechanism is uncoupled from said connection unit. Accordingly, at this time, displacement of said brake pedal 94 is transmitted to said connection unit, and is thencefrom transmitted, via said second displacement submechanism, to operate the wheel braking elements of the RR car 100.

According to a particular feature of this construction, the distance of the attachment point of the end of the link rod 200 to the brake pedal 94 of the FF car 90 from the pivotal axis of the brake pedal 94 is arranged to be substantially greater than the distance of the point of attachment of the push rod 98 to the brake pedal 94 from the pivotal axis of the brake pedal 94, and this means that the stroke of the long link rod 206 is substantially longer than the stroke of the push rod 98; in the shown construction, it is proportionally about twice as long. This is compensated for in the connection of the short rod 208 to the connection unit comprising the fourth bell crank 303 in the RR car 100, because the distance of the connection point of the rod 208 to the end of the bar 311 from the pivotal point of the fourth bell crank 303 is substantially larger than the distance of the attachment point of the end of the push rod 198 to this fourth bell crank 303. Thus, the aforementioned magnification of the stroke of the long link rod 206, over the stroke of the push rod 98, is cancelled here; in other words, when the FF car 90 and the RR car 100 are coupled together into the combination car, and when the brake pedal 94 of the FF car 90 is depressed by the driver of the combination car, then the stroke of the push rod 98 will be approximately the same as the stroke of the push rod 198 in the RR car 100, both of these being approximately half, in the shown construction, of the stroke of the link rod 206. This is in order to minimize the effect of play in the linkage mechanism comprising the link rod 206, and in order to minimize the effects of slight variations in the coupling position of the body 1 of the FF car 90 to the body 101 of the RR car 100. Thus, this ensures that the proper synchronization of the brake systems of the FF car 90 and of the RR car 100 is promoted.

However, the aforesaid provision of adjustability of the distance between the pin 319, i.e. the point where the rod 208 is coupled to the connection unit comprising the fourth bell crank 303 and the rod 311, and the pivotal axis of this fourth bell crank 303, ensures that the ratio between the strokes of the push rod 98 and the push rod 198, i.e. the ratio of the output displacement amount of said connection unit to its input displacement amount, with reference to its transmission of displacement from said third displacement transmission mechanism to the wheel braking elements of the RR car 100, may be varied within certain limits. In the shown construction, this adjustment may be performed continuously by operation of the nuts and lock nuts provided on the screwed portion of the bar 311, as explained above. Further, when coupling the FF car 90 and the RR car 100 together to form the combination car, it is desirable that the turnbuckle 207 should be so adjusted that the braking system of the RR car 100 should come on, i.e. should start to be applied, somewhat before the braking system of the FF car 90 starts to be applied; this is in order to obtain stability in the control of the braking of the combination car, and is according to principles well known to those skilled in the brake art.

CONSTRUCTION OF THE SECOND EXAMPLE

Figure 27:
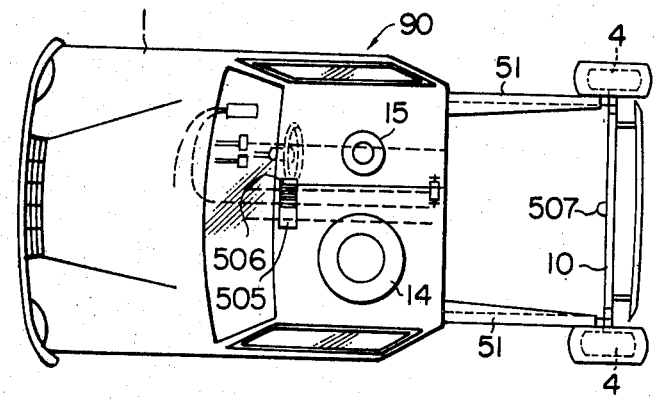
FIG. 27 is a plan view, in partly diagrammatical form, showing an FF car which is to be incorporated in a second exemplary constructional example of the combination car according to the above described construction.
Figure 28:
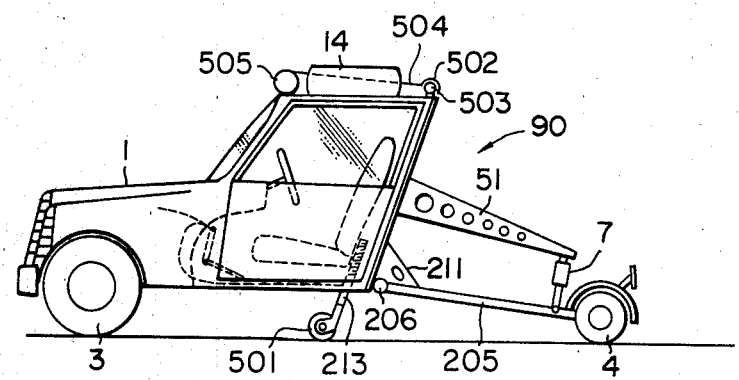
FIG. 28 is a side view, in partly diagrammatical form, of the FF car which is to be incorporated in the second exemplary constructional example of the combination car according to the above described construction, shown in FIG. 27.
Figure 29:
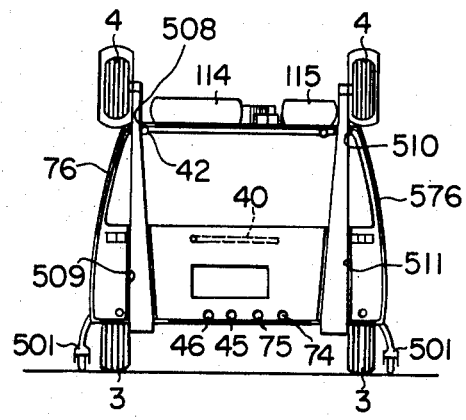
FIG. 29 is a rear view, in partly diagrammatical form, of the FF car which is to be incorporated in the second exemplary constructional example of the combination car according to the above described construction, shown in FIGS. 27 and 28.
Figure 30:
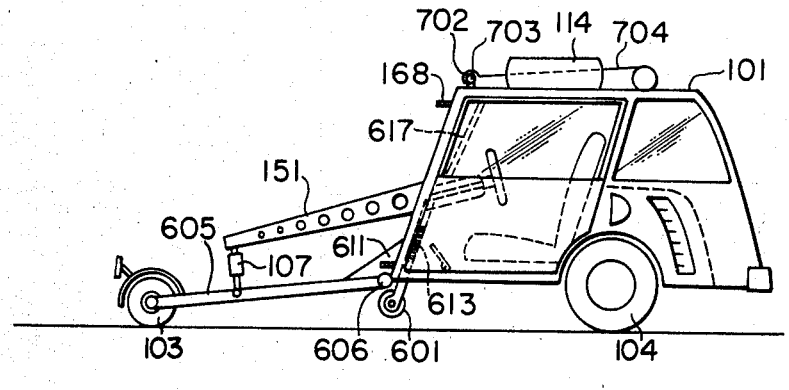
FIG. 30 is a side view, in partly diagrammatical form, of an RR car which is to be incorporated in the second exemplary constructional example of the combination car according to the above described construction.
Figure 31:
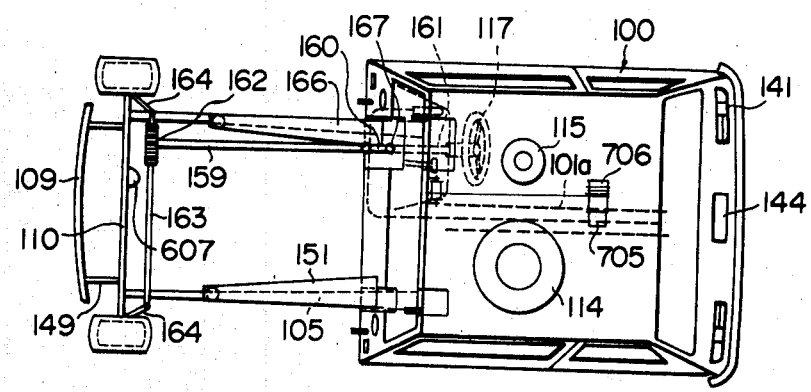
FIG. 31 is a plan view, in partly diagrammatical form, of the RR car which is to be incorporated in the second exemplary constructional example of the combination car according to the above described construction, shown in FIG. 30.
Figure 32:
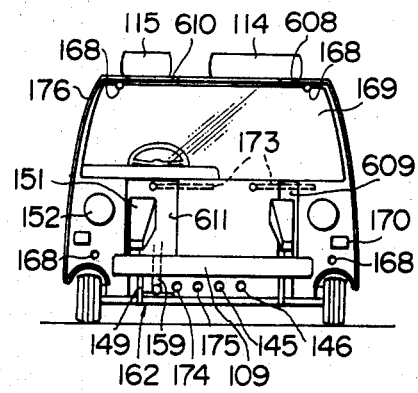
FIG. 32 is a front view, in partly diagrammatical form, of the RR car which is to be incorporated in the second exemplary constructional example of the combination car according to the above described construction, shown in FIGS. 30 and 31.
Figure 33:
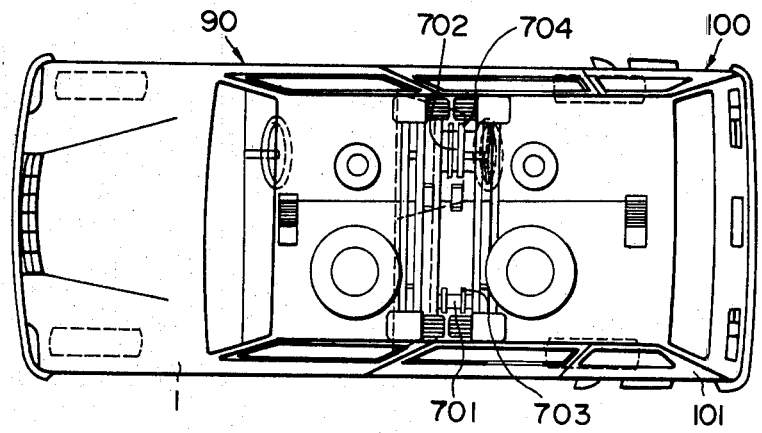
FIG. 33 is a plan view, in partly diagrammatical form, of the second exemplary constructional example of the combination car according to the above described construction, which is formed by coupling together the FF car shown in FIGS. 27, 28, and 29, and the RR car shown in FIGS. 30, 31, and 32, so as to form a coupled car.
Figure 34:
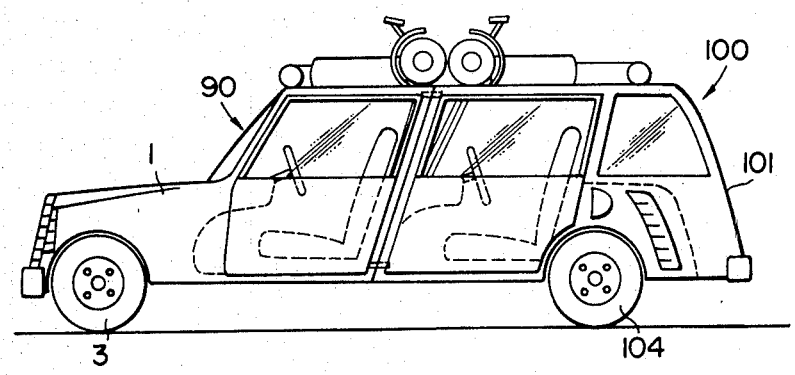
FIG. 34 is a side view, in partly diagrammatical form, of the second exemplary constructional example of the combination car according to the above described construction shown in FIG. 33.

FIGS. 27–34 show the general construction of a second exemplary constructional example of the combination car system; FIGS. 27–29 show the first or front car in plan, side, and rear views, respectively; FIGS. 30–32 show the rear or second car in side, plan, and front views, respectively; and FIGS. 33 and 34 show the combination car formed by coupling together the first car and the second car in plan and side views, respectively.

The First Car

The first or front car, in this second exemplary constructional example, is also generally designated by the reference numeral 90, and is again a front engine front wheel drive car, i.e. a so called FF car. The body 1 of the first car 90 is formed in its front portion with an engine compartment, within which an engine, a transmission, and a transaxle assembly, none of which are shown in the drawings, are fitted. This engine, transmission, and transaxle assembly is arranged to drive the front wheels 3 of the FF car 90. It is again considered to be preferable for the transmission of the FF car 90 to be a manual transmission with a clutch.

Out of the back of the FF car 90 there protrudes a strut assembly which carries the rear wheels 4 of the FF car 90, and thus, when the FF car 90 is being operated independently, it runs on its front wheels 3 and its rear wheels 4. It is again considered desirable that the rear wheels 4 be of a smaller diameter than the front wheels 3, from considerations of convenience when the rear wheels 4 are to be stowed away, when the FF car 90 is coupled to the RR car 100 as will be described later.

In more detail, a pair of leaf springs 205 are hinged to the rear of the lower part of the body 1 of the FF car 90 by hinges 206, and extend backwards therefrom. In this second exemplary constructional example of the present invention, in contrast to the first exemplary constructional example shown in FIGS. 1–8, the fixing points of the hinges 206 are not under the floor of the body 1 of the FF car 90, but are on the rear face panel thereof, near its lower edge. The rear ends of these left and right leaf springs 205 are non-detachably, in this second exemplary constructional example, coupled to a lateral link 10, and on the outside sides of the joining portions there are mounted the left and right rear wheels 4. Accordingly, by the flexing of the leaf springs 205, the rear wheels 4 may move upwards or downwards, to accomodate irregularities in road surface or the like. In this second exemplary constructional example of the present invention, the rear suspension leaf springs are somewhat longer than were the rear suspension leaf springs 5 of the first exemplary constructional example shown in FIGS. 1–8; in fact, the leaf springs 205 of this exemplary constructional example are slightly longer than the height of the rear face panel of the body 1 of the FF car 90, for reasons which will become clear later. Above the rear suspension leaf springs 205, to the rear face of the body 1 of the FF car 90, there are detachably attached brackets 51, which extend backwards and whose rear ends are coupled to the upper ends of a pair of shock absorbers 7, the lower ends of which are detachably connected to the leaf springs 205 near to their rear ends, in order to damp the upwards and downwards motion of the rear wheels 4. A rear bumper is attached to the lateral link 10 by left and right stays, and, further, rear fenders are mounted over the rear wheels 4 to guard against mud and stones and the like flying off therefrom, said rear fenders being fixed to the rear suspension leaf springs 205 by stays or the like which are not shown in the figures. In the center of the lateral link 10 there is provided a hoisting loop 507.

As an alternative mode of construction, it would again be possible for the members 205 to be, not leaf springs, but instead rigid beams such as steel tubes or the like. In this case, compression coil springs would be disposed around the shock absorbers 7, in order to provide rear suspension cushioning for the rear wheels 4, and the upper ends of these compression coil springs would bear against the brackets 51, which would thus bear the entire weight applied to the rear wheels 4. Either of these constructions is practicable.

No rear suspension adjusters such as the rear suspension adjusters 11 of the first exemplary constructional example shown in FIGS. 1–8 are provided in this second exemplary constructional example. Instead, two rigid brackets 211 are provided for fixing the angles of the bases of the rear suspension leaf springs 205, i.e. the hinging angles of the hinges 206, with respect to the body 1 of the FF car 90; and these brackets 211 are selectively detachable, so as when detached to leave the rear suspension leaf springs 205 free to rotate with respect to the body 1. Thus, the riding height of the rear of the vehicle body 1 of the FF car 90 is not adjustable, in this second exemplary constructional example, but is fixed.

On the roof of the FF car 90 there is provided a power winch, which comprises a winding drum 506 and a motor 505 which drives said winding drum 505. A cable 504 is wound around the winding drum 505, and has a hook 502 at its other end which is disposed to the rear of the roof of the vehicle body 1. At the rear edge of the roof of the body 1 of the FF car 90 there is provided a roller 503, for guiding the cable 504, and, when this hoisting arrangement is not being used, the hook 502 may be hooked over this roller 503 for safe keeping, as shown in FIG. 28. The hook 502 is adapted to be selectively engaged with the hoisting loop 507.

Two support jacks 213 are provided at the rear of the body 1 of the FF car 90, and these support jacks are provided, in this second exemplary constructional example, with casters 501 at their lower ends. When these jacks 213 are lowered so that their casters 501 contact the road surface, as shown in FIG. 28, then, by removal of the detachable brackets 211, and by hooking the hook 502 into the hoisting loop 507 and by operating the motor 506 so as to wind the cable 504 up on the drum 505, said cable 504 sliding easily over the roller 503, by the pulling up of the lateral link 10 by the cable 504 the rear wheels 4 may be lifted up from road contact to the position shown in FIG. 29, by the leaf springs 205 being pivoted around the hinges 206. In this condition, the entire weight of the rear portion of the FF car 90 is supported on the support jacks 213.

It should be particularly noted that in this condition the rear suspension leaf springs 205 fit into corresponding groove portions 508 and 509, and 510 and 511, on the rear face of the body 1 of the FF car 90, as can be seen in FIG. 29. Accordingly, they are effectively flush with the rear face panel of the vehicle body 1, so as to allow snug mating thereagainst of the front face panel of the body 101 of the RR car 100, as will be seen in more detail hereinafter.

Again, the FF car 90 comprises: a steering wheel, which is coupled in a per se conventional fashion to the front wheels 3 of the FF car 90 so as to steer them; a seat; an accelerator pedal, which controls the engine (not shown); a front spare tire 14 and a rear spare tire 15; and a rear window glass, which is lowerable downwards by a window regulating system not shown in the figures. Further, there are provided: a rear window wiper system 40 for keeping the rear window clean and transparent during rainy conditions or the like, which is constructed as a concealed wiper which when not in use is stowed away within the vehicle body 1; a combination rear lamp which combines in one unit a running lamp, a stop lamp, a winker lamp, and a backup lamp; and a construction for fixing a license plate—all of which elements are so constructed that, as seen from the side as shown in FIG. 30, they are effectively flush with the rear face panel of the vehicle body 1 of the FF car 90.

In the rear of the vehicle body 1 of the FF car 90 there are provided four fixing holes 42, approximately at the four corners of the rear face thereof, for receiving corresponding bolts 168 provided on the RR car 100, when the FF car 90 and the RR car 100 are to be coupled together, as will be explained later. There are provided, in this second exemplary constructional example, no guide rails such as the guide rails which received the guides 165 provided at the front ends of the front suspension leaf springs 105 which supported the front wheels 103 of the RR car 100, in the first exemplary constructional example shown in FIGS. 1–8. In this second exemplary constructional example, however, there are provided holes 45, 46, 74, and 75, formed at the lower edge of the rear face panel of the FF car 90, for transmitting various control functions to the RR car 100, when the RR car 100 is coupled to the FF car 90 as will be more particularly explained later. The functions of these holes are substantially as those of the holes 45, 46, 74, and 75 in the first exemplary constructional example as shown in FIGS. 1–8; in outline, 45 is a hole for passing a Bowden cable from the accelerator pedal of the FF car 90 to the RR car 100, according to the engine control system according to the present invention; 46 is a hole for connecting together the operations of the electrical systems of the FF car 90 and the RR car 100, in order to synchronize various electrical functions in the RR car 100 with the corresponding functions in the FF car 90; 74 is a hole for passing a brake link 206 which transmits brake pedal movement from the FF car 90 to the RR car 100; and 75 is a hole for passing an electrical connection for synchronizing the operation of the gearbox in the RR car 100 with the operation of the gearbox in the FF car 90. Finally, around the entire periphery of the rear face panel of the FF car 90, and also around the sides of the groove portions 508, 509, 510, and 511, there runs a sealing type weather strip 76, for sealing against the front face panel of the RR car 100, when the FF car 90 and the RR car 100 are to be coupled together, as will be explained later.

The Second Car

Referring particularly to FIGS. 30–32, the second or rear car will now be described. This car is again designated by the reference numeral 100, and the body 101 thereof again has the general appearance of the rear half of the body of a normal or conventional motor vehicle. Again, an engine compartment is provided in the rear of the body 101 of the rear car 100, and thus this second car is gain a rear engine rear wheel driver car, i.e. a so called RR car. There are also provided a transmission and a transaxle assembly, all, as well as the engine, located behind the seat of the RR car 100.

Similarly to the FF car 90, the front wheels 103 of the RR car 100 are mounted on a strut assembly projecting from the front of the body 101 of the RR car 100. From considerations of convenience of stowability when the RR car 100 is to be coupled to the FF car 90, it is again preferable that the front wheels 103 should be of a smaller diameter than the rear wheels 104. Conveniently, the size of these front wheels 103 of the RR car 100 may be the same as that of the rear wheels 4 of the FF car 90, and, similarly, the size of the rear wheels 104 of the RR car 100 may conveniently be the same as the size of the front wheels 3 of the FF car 90.

In more detail, two front suspension leaf springs 605 extend forwards from the front of the body 101 of the RR car 100, to the front ends of which the front wheels 103 are mounted. In this second exemplary constructional example, the rear ends of these leaf springs 605 are hinged via hinges 606, not to the front part of the underneath of the floor of the body 101 of the RR car 100, as was the case in the first exemplary constructional example shown in FIGS. 1–8, but to the lower edge of the front face panel of said body 101. No front suspension adjusters are provided, like the front suspension adjusters 111 of the first shown exemplary constructional example; instead, two rigid brackets 611 are provided for fixing the angles of the bases of the front suspension leaf springs 605, i.e. the hinging angles of the hinges 606, with respect to the body 101 of the RR car 100; and these brackets 611 are selectively detachable, so as when detached to leave the front suspension leaf springs 605 free to rotate with respect to the body 101. Thus, the riding height of the front of the body 101 of the RR car 100 is not adjustable, in this second exemplary constructional example, but is fixed.

Above the leaf springs 605, there are detachably attached two brackets 151 to the front face of the body 101 of the RR car 100, and between the front ends of these brackets 101 and forward portions of the front suspension leaf springs 605 there are detachably fitted a pair of shock absorbers 107, in order to damp the upward and downward motion of the leaf springs 605 and thus to provide good driving stability and ridability for the RR car 100. Similarly to the case in the FF car 90, as an alternative possible construction, the members 605 could be constructed as rigid members such as steel bars, rather than as resilient members such as leaf springs, and in this case it would be necessary to provide compression coil springs or the like arranged around the shock absorbers 107, with the upper ends of these compression coil springs bearing against the brackets 151 and their lower ends bearing against the rigid members 605, and these compression coil springs would then fulfil the same function as do the leaf springs 605 in the shown second exemplary constructional example. Of course, in this case the brackets 611 would not be provided. Either of these constructions would be acceptable.

The steering arrangements for the RR car 100 are substantially the same as those in the first exemplary constructional example shown in FIGS. 1–8, and hence detailed description thereof will be omitted to avoid duplication. It should be noted that the first and/or the second steering universal joint, i.e. the universal joint joining the steering shafts 161 and 160 and/or the universal joint joining the steering shafts 160 and 159, should be capable of being folded completely around or disassembled so that the shaft 161 or 160 and the shaft 160 or 159, respectively, pass through the collinear condition. Further, it should be noted that a hoisting loop 607 is provided at an intermediate portion of the solid front axle 110.

A front bumper 109 is connected via two stays 149 to the front axle 110, but need not be detachable. Further, over the front wheels 103, there are attached a pair of fenders, by constructions which are not shown in the figures, which in this exemplary constructional example also need not be detachable.

In this second exemplary constructional example of the present invention, the front suspension leaf springs 605 are somewhat longer than were the front suspension leaf springs 105 of the RR car 100 in the first exemplary constructional example shown in FIGS. 1–8; in fact, the leaf springs 605 of this exemplary constructional example are slightly longer than the height of the front face panel of the body 101 of the RR car 100.

On the roof of the RR car 100 there is provided a power winch, which comprises a winding drum 706 and a motor 705 which drives said winding drum 705. A cable 704 is wound around the winding drum 705, and has a hook 702 at its other end which is disposed to the front of the roof of the vehicle body 101. At the front edge of the roof of the body 101 of the RR car 100 there is provided a roller 703, for guiding the cable 704, and, when this hoisting arrangement is not being used, the hook 702 may be hooked over this roller 703 for safe keeping, as shown in FIG. 30. The hook 702 is adapted to be selectively engaged with the hoisting loop 607.

Two support jacks 613 are provided at the front of the body 101 of the RR car 100, and these support jacks 613 are provided, in this second exemplary constructional example, with casters 601 at their lower ends. When these jacks 613 are lowered so that their casters 601 contact the road surface, then, by removal of the detachable brackets 611, and by hooking the hook 702 into the hoisting loop 607 and by operating the motor 706 so as to wind the cable 704 up on the drum 705, said cable 704 sliding easily over the roller 703, by the pulling up of the solid front axle 110 by the cable 704 the front wheels 103 may be lifted up from road contact to their positions wherein they are over the roof of the body 101 of the RR car 100, by the leaf springs 605 being pivoted around the hinges 606. In this condition, the entire weight of the front portion of the RR car 100 is supported on the support jacks 613.

It should be particularly noted that in this condition the front suspension leaf springs 605 fit into corresponding groove portions 608 and 609, and 610 and 611, on the front face of the body 101 of the RR car 100, which can be seen in FIG. 32. Accordingly, these leaf springs 605 are effectively flush with the front face panel of the body 101 of the RR car 100, so as to allow snug mating thereagainst of the rear face panel of the body 1 of the FF car 90, as will be seen in more detail hereinafter.

As a particular feature of the shown construction, the groove portions 610 and 611 are made rather wider than needed to accomodate the corresponding front suspension leaf spring 605, in order to accomodate the steering shaft 159, which extends generally parallel to this leaf spring 605.

The reference numerals 14 and 15 again denote spare tires for, respectively, the rear wheels 104 and the front wheels 103, said spare tires being mounted on the roof of the body 101 of the RR car 100. Air intake holes are provided for a rear engine radiator and a rear engine air cleaner. From the front face of the body 101 of the RR car 100 there project four fixing bolts 168, in positions corresponding to the positions of the four fixing holes 42, previously mentioned, provided on the rear face of the body 1 of the FF car 90. In this second exemplary constructional example, there are provided no guides such as the guides 165 provided on the upper sides of the front suspension leaf springs 105 in the first exemplary constructional example shown in FIGS. 1–8.

Referring particularly now to FIG. 30, the windshield 617 of the RR car 100 is arranged to slope somewhat backwards, behind the level of the backs of the groove portions 608, 609, 610, and 611, so as not to interfere with the leaf springs 605 and the steering shaft 159, when these are folded up against the front of the body 101 of the RR car 100. This windshield 617 is again lowerable, and a concealed type wiper arrangement 173 (see FIG. 32) is provided for cleaning this windshield 617 during rainy conditions or the like. The reference numeral 152 denotes a head lamp, and the reference numeral 170 denotes a combination running lamp and indicator lamp. Four holes 146, 145, 175, and 174 are provided in the front face panel of the body 101 of the RR car 100, in positions corresponding, respectively, to the holes 46, 45, 75, and 74 formed on the rear face panel of the body 1 of the FF car 90, when these respective faces of the RR car 100 and the FF car 90 are brought together into contact. These holes have essentially the same functions as the corresponding holes in the first exemplary constructional example shown in FIGS. 1–8, and hence detailed description thereof will be omitted, in order to avoid duplication.

It is again considered preferable that the transmission in the RR car 100 should be an automatic transmission. The reference numeral 144 again denotes a licence plate fixing portion. The reference numeral 141 denotes a combination rear running lamp, stop lamp, indicator lamp, and backup lamp. A weather strip 176 is provided all around the front face panel of the RR car 100, and also around the edges of the groove portions 608, 609, 610, and 611, for sealing against the rear face panel of the FF car 90, when the RR car 100 and the FF car 90 are joined together into the combination car.

The combination car

The FF car 90 and the RR car 100 previously described are also each of them in itself quite capable of running on its own. However, when it is desired to have a large and impressive motor vehicle of high capacity, capable of accommodating four or five people and a reasonable amount of luggage, and capable of cruising for long distances at high speed such as on an expressway, then the FF car 90 and the RR car 100 are coupled together, as will now be explained, into a combination car.

For this coupling, first the body support jacks 213 of the FF car 90, and the body support jacks 613 of the RR car 100, are lowered downwards, so as to bring their respective casters 501 and 601 into contact with the road surface, and so as to support, respectively, the rear of the body 1 of the FF car 90, and the front of the body 101 of the RR car 100. Next, on the FF car 90, the brackets 51 are detached from the back face of the body 1 thereof, and, concurrently with this, the lower ends of the shock absorbers 7 are detached from connection with the rear suspension leaf springs 205. Similarly, on the RR car 100, the detachable brackets 151 are removed from the front face of the body 101 thereof, and concurrently with this the lower ends of the shock absorbers 107 are detached from the front suspension leaf springs 605 thereof. These brackets 51 and 151, and the shock absorbers 7 and 107, may be conveniently stored in a storage space provided to the rear of the rear engine compartment in the body 101 of the RR car 100.

Next, the hook 502 is released from the roller 503, and is hooked into the hoisting loop 507 on the lateral link 10 of the FF car 90, with the cable 504 passing over the roller 503, and the motor 506 is operated so as to wind the cable 504 up on the winding drum 505 and so as to thereby hoist up the rear suspension leaf springs 205 with the back wheels 4, the bumper and the fenders associated therewith, and the lateral link 10, up to the position shown in FIG. 29, wherein the rear leaf springs 205 are fitted into the groove portions 508, 509, 510, and 511, so as to be flush with the rear face panel of the FF car 90. Similarly, the hook 702 is released from the roller 703, and is hooked into the hoisting loop 607 on the front axle 110 of the RR car 100, with the cable 704 passing over the roller 703, and the motor 706 is operated so as to wind up the cable 704 up on the winding drum 705 and so as to thereby hoist up the front suspension leaf springs 605 with the front wheels 103, the front axle 110, the bumper and the fenders associated therewith, etc., up to a position wherein the front leaf springs 605 are fitted into the groove portions 608, 609, 610, and 611, so as to be flush with the front face panel of the RR car 100, with the steering shaft 159 also being brought up with the upper leaf spring in FIG. 31, so as to fit into the groove portions 610 and 611.

Next, with the rear wheels 4 of the FF car 90 in this high raised position, and also with the front wheels 103 of the RR car in this high raised position, the front of the RR car 100 is approached towards the back of the FF car 90; either of the cars may be driven by its motor to perform this approaching movement, although pushing by hand should suffice, because of the provision of the casters 501 and 601. This approaching movement is continued until the front face panel of the body 101 of the RR car 100 comes into contact with the rear face panel of the body 1 of the FF car 90, with the four fixing bolts 168 provided on the front face of the body 101 of the RR car 100 entering into the four fixing holes 42 provided on the rear face of the body 2 of the FF car 90. If necessary, at this time, the exact correspondence of the front face of the body 101 of the RR car 100 and of the rear face of the body 1 of the FF car 90 may be positively assured by adjusting the body support jacks 213 of the FF car 90, and/or the body support jacks 613 of the RR car 100. When all of the bolts 168 have properly entered into their corresponding holes 42, then nuts (not shown) are fitted onto these bolts 168 so as positively to attach together the RR car 100 and the FF car 90, and these nuts are tightened. Thus the vehicle body 1 of the FF car 90 and the vehicle body 101 of the RR car 100 are tightly and immovably attached together.

Next, the body support jacks 213 of the FF car 90, and the body support jacks 613 of the RR car 100, are raised up out of the way. Next, after this physical linking of the FF car 90 to the RR car 100 has been performed, the rear windows of the FF car 90 and the RR car 100 are lowered, so as to communicate the interiors of the FF car 90 and of the RR car 100. Next, via the holes 45 and 145 which are opposed, the accelerator pedal linkage of the FF car 90 is coupled to the accelerator pedal linkage of the RR car 100, according to the present invention; via the holes 46 and 146 which are opposed, various electrical circuits of the FF car 90 are coupled to various electrical circuits of the RR car 100; via the holes 74 and 174 which are opposed, the braking system of the FF car 90 is coupled to the braking system of the RR car 100; and, via the holes 75 and 175 which are opposed, the operations of the transmissions of the FF car 90 and of the RR car 100 are connected. These operations are done in the same ways as in the first exemplary constructional example shown in FIGS. 1-8.

A good seal is provided between the body 1 of the FF car 90 and the body 101 of the RR car 100, by the weather strips 76 and 176 provided on the opposing faces of these vehicle bodies. After the FF car 90 and the RR car 100 have been coupled together as described above, covers 701 and 702 which are provided with weather strips around their entire circumferences are attached to attachment devices 703 and 704 respectively, and provide good sealing against rain or the like entering into the upper ends of the upper groove portions 608 and 610.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

I claim:

1. In a combination car system, comprising:
  (a) a first car, capable of running independently, comprising a first pair of front wheels by which said first car is driven, a first pair of rear wheels, a first engine, and a first engine output control element, displacement of which controls the engine output of said first engine; and
  (b) a second car, capable of running independently, comprising a second pair of front wheels, a second pair of rear wheels by which said second car is driven, a second engine, and a second output control element, displacement of which controls the engine output of said second engine;
  (c) said first car and said second car being couplable together into a coupled car which runs on said first pair of front wheels of said first car and said second pair of rear wheels of said second car, with said first pair of rear wheels of said first car and said second pair of front wheels of said second car being removed from road contact:

an engine control system, comprising:
  (d) a first accelerator pedal attached to said first car;
  (e) a first displacement transmission mechanism, which transmits displacement of said first accelerator pedal to said first engine output control element;
  (f) a second accelerator pedal attached to said second car;
  (g) a second displacement transmission mechanism, which, when said second car is running independently, transmits displacement of said second accelerator pedal to said second engine output control element, comprising:
(g1) a connection unit;
(g2) a first displacement transmission submechanism, which is, when said second car is running independently, removably drivingly coupled to said connection unit, and which at this time transmits displacement of said second accelerator pedal to said connection unit; and
(g3) a second displacement transmission submechanism, which trasmits displacement of said connection unit to said second engine output control element;
(h) and a third displacement transmission mechanism which, when said first car and said second car are coupled together into said coupled car, extends from a part of said first displacement transmission mechanism to be removably drivingly coupled to said connection unit, said first displacement transmission submechanism being at this time uncoupled from said connection unit;
(i) whereby, when said first car and said second car are coupled together into said coupled car, the operation of said first engine of said first car and the operation of said second engine of said second car are coupled together and are controlled from said first car by displacement of said first accelerator pedal, the controlling operation of said second accelerator pedal being at this time disenabled.

2. An engine control system according to claim 1, wherein said connection unit is so constructed that the ratio of its output displacement amount to its input displacement amount, with reference to its transmission of displacement from either said first displacement transmission submechanism or from said third displacement transmission mechanism, via said second displacement transmission submechanism, to said second engine output control element, may be changed.

3. An engine control system according to claim 1, wherein said third displacement transmission mechanism comprises a cable and sheath assembly.

4. An engine control system according to claim 1, wherein said connection unit comprises a lever which rotates around a pivotal axis.

5. An engine control system according to claim 2, wherein said connection unit comprises a pivot and a lever which rotates around said pivot, said second displacement transmission submechanism being connected to said lever at a variable point.

6. An engine control system according to claim 2, wherein said connection unit comprises a pivot and a lever which rotates around said pivot, and wherein either said first displacement transmission submechanism, when said second car is running independently, or said third displacement transmission mechanism, when said first and said second car are coupled together into said coupled car, is removably coupled to a point on said connection unit which is substantially continuously movable towards and away from said pivot.

7. An engine control system according to claim 6, wherein said point is movable by the operation of a screw.

* * * * *